United States Patent [19]

Lempel

[11] Patent Number: 5,796,434
[45] Date of Patent: Aug. 18, 1998

[54] SYSTEM AND METHOD FOR PERFORMING MOTION ESTIMATION IN THE DCT DOMAIN WITH IMPROVED EFFICIENCY

[75] Inventor: Mody Lempel, Sunnyvale, Calif.

[73] Assignee: LSI Logic Corporation, Milpitas, Calif.

[21] Appl. No.: 660,423

[22] Filed: Jun. 7, 1996

[51] Int. Cl.[6] .................. H04N 7/30; H04N 7/32
[52] U.S. Cl. .................. 348/403; 348/699; 348/416; 348/413; 348/407; 348/402
[58] Field of Search .................. 348/403, 400–402, 348/407–413, 415–416, 420, 699; 386/27, 33, 109, 111; 382/166, 235, 236, 239, 248, 250; H04N 7/30, 7/32

[56] References Cited

U.S. PATENT DOCUMENTS

| 5,301,019 | 4/1994 | Citta ................................ | 348/416 |
| 5,311,310 | 5/1994 | Jozawa et al. .................... | 348/416 |
| 5,467,086 | 11/1995 | Jeong .............................. | 348/415 |
| 5,537,155 | 7/1996 | O'Connell et al. .............. | 348/699 |

OTHER PUBLICATIONS

Merhav et al., 1996 Hewlett–Packard Laboratories Research Library Technical Report entitled, "Fast Inverse Motion Compensation Algorithms for MPEG-2 and for Partial DCT Information," pp. 1–25.

Merhav et al., 1995 Hewlett–Packard Laboratories Research Library Technical Report entitled, "A Fast Algorithm for DCT–Domain Inverse Motion Compensation," pp. 1–15.

Merhav et al., 1995 Hewlett–Packard Laboratories Research Library Technical Report entitled, "A Fast Algorithm for DCT Domain Filtering," pp. 1–10.

Kresch et al., 1995 Hewlett–Packard Laboratories Research Library Technical Report entitled, "Fast DCT Domain Filtering Using the DCT and the DST," pp. pp. 1–24.

Koc et al., "Discrete–Cosine/Sine–Transform Based Motion Estimation", IEEE, Image Processing, 1994 International Conference, pp. 771–775.

(List continued on next page.)

Primary Examiner—Tommy P. Chin
Assistant Examiner—Vu Le
Attorney, Agent, or Firm—B. Noel Kivlin; Conley, Roase & Tayon; Jeffrey C. Hood

[57] ABSTRACT

A system and method for estimating motion vectors between frames of a video sequence which operates in the DCT domain with improved efficiency and reduced computational requirements. The motion estimation system operates to encode a target block using pointers or motion vectors to a previously encoded block, referred to as the reference block or search block. The system first partitions the target frame into a plurality of target blocks, and DCT transforms the target blocks in the target frame. The motion estimation system then selects a candidate block from the search frame and DCT transforms the selected candidate block. The motion estimation system uses a novel method for selecting candidate blocks which allows re-use of at least a portion of the transformed values of a prior selected candidate block. After the candidate block is selected, the motion estimation system determines one or more "relevant" target blocks in the target frame which have a corresponding search window which includes the selected candidate block. The system then computes a distance between the transformed values of the selected candidate block and the transformed values of each of the determined target blocks. If a better metric is found for a respective target block, the system stores the location of the selected candidate block for the respective target block. The above steps are performed for each of the possible candidate blocks in the search frame. This method thus produces or determines "best fit" candidate blocks for each of the target blocks. The system then computes motion vectors for each of the target blocks in the target frame based on these "best fit" blocks.

29 Claims, 21 Drawing Sheets

OTHER PUBLICATIONS

Chang et al, "A New Approach to Decoding and Compositing Motion–Compensated DCT–Based Images", ICASSP, Apr. 1993: Acoustics Speech & Signal Processing Conference, pp. V–421 to V–424.

Knudsen et al, "Moving Object Detection and Trajectory Estimation in The Transform/Spatiotemporal Mixed Domain", ICASSP Sep. '92: Acoustics, Speech & Signal Processing Conference, pp. III–505 to III–508.

Jozawa et al, "Interframe Video Coding Using Overlapped Motion Compensation and Perfect Reconstruction Filter Banks", ICASSP Sep. '92: Acoustics, Speech & Signal Processing Conference, pp. IV–649 to IV–652.

Zaciu et al, "Image Compression Using an Overcomplete Discrete Wavelet Transform", IEEE Trans. on Consumer Electronics, pp. 800–807, Aug. 1996.

Young et al, "Frequency–Domain Motion Estimation Using a Complex Lapped Transform", IEEE Trans. on Image Processing, vol. 2, No. 1, pp. 2–17, Jan. 1993.

Selection of Candidate Blocks

Selection of Candidate Blocks

Selection of Candidate Blocks

Selection of Candidate Blocks

Selection of Candidate Blocks

"Relevant" Target Blocks Shaded

"Relevant" Target Blocks Shaded

SYSTEM AND METHOD FOR PERFORMING MOTION ESTIMATION IN THE DCT DOMAIN WITH IMPROVED EFFICIENCY

INCORPORATION BY REFERENCE

The following references are hereby incorporated by reference.

The ISO/IEC MPEG specification referred to as ISO/IEC 13818 is hereby incorporated by reference in its entirety.

FIELD OF THE INVENTION

The present invention relates generally to digital video compression, and more particularly to a system for computing motion estimation vectors between video frames in the discrete cosine transform (DCT) domain, wherein the system performs DCT domain block comparisons from the perspective of candidate blocks in the search frame and intelligently selects candidate blocks for reduced computations and improved performance.

DESCRIPTION OF RELATED ART

Full-motion digital video requires a large amount of storage and data transfer bandwidth. Thus, video systems use various types of video compression algorithms to reduce the amount of necessary storage and transfer bandwidth. In general, different video compression methods exist for still graphic images and for full-motion video. Intraframe compression methods are used to compress data within a still image or single frame using spatial redundancies within the frame. Interframe compression methods are used to compress multiple frames, i.e., motion video, using the temporal redundancy between the frames. Interframe compression methods are used exclusively for motion video, either alone or in conjunction with intraframe compression methods.

Intraframe or still image compression techniques generally use frequency domain techniques, such as the discrete cosine transform (DCT). Intraframe compression typically uses the frequency characteristics of a picture frame to efficiently encode a frame and remove spatial redundancy. Examples of video data compression for still graphic images are JPEG (Joint Photographic Experts Group) compression and RLE (run-length encoding). JPEG compression is a group of related standards that use the discrete cosine transform (DCT) to provide either lossless (no image quality degradation) or lossy (imperceptible to severe degradation) compression. Although JPEG compression was originally designed for the compression of still images rather than video, JPEG compression is used in some motion video applications. The RLE compression method operates by testing for duplicated pixels in a single line of the bit map and storing the number of consecutive duplicate pixels rather than the data for the pixels themselves.

In contrast to compression algorithms for still images, most video compression algorithms are designed to compress full motion video. As mentioned above, video compression algorithms for motion video use a concept referred to as interframe compression to remove temporal redundancies between frames. Interframe compression involves storing only the differences between successive frames in the data file. Interframe compression stores the entire image of a key frame or reference frame, generally in a moderately compressed format. Successive frames are compared with the key frame, and only the differences between the key frame and the successive frames are stored. Periodically, such as when new scenes are displayed, new key frames are stored, and subsequent comparisons begin from this new reference point. It is noted that the interframe compression ratio may be kept constant while varying the video quality. Alternatively, interframe compression ratios may be content-dependent, i.e., if the video clip being compressed includes many abrupt scene transitions from one image to another, the compression is less efficient. Examples of video compression which use an interframe compression technique are MPEG, DVI and Indeo, among others.

MPEG Background

A compression standard referred to as MPEG (Moving Pictures Experts Group) compression is a set of methods for compression and decompression of full motion video images which uses the interframe and intraframe compression techniques described above. MPEG compression uses both motion compensation and discrete cosine transform (DCT) processes, among others, and can yield compression ratios of more than 200:1.

The two predominant MPEG standards are referred to as MPEG-1 and MPEG-2. The MPEG-1 standard generally concerns inter-field data reduction using block-based motion compensation prediction (MCP), which generally uses temporal differential pulse code modulation (DPCM). The MPEG-2 standard is similar to the MPEG-1 standard, but includes extensions to cover a wider range of applications, including interlaced digital video such as high definition television (HDTV).

Interframe compression methods such as MPEG are based on the fact that, in most video sequences, the background remains relatively stable while action takes place in the foreground. The background may move, but large portions of successive frames in a video sequence are redundant. MPEG compression uses this inherent redundancy to encode or compress frames in the sequence.

An MPEG stream includes three types of pictures, referred to as the Intra (I) frame, the Predicted (P) frame, and the Bi-directional Interpolated (B) frame. The I or Intraframes contain the video data for the entire frame of video and are typically placed every 10 to 15 frames. Intraframes provide entry points into the file for random access, and are generally only moderately compressed. Predicted frames are encoded with reference to a past frame, i.e., a prior Intraframe or Predicted frame. Thus P frames only include changes relative to prior I or P frames. In general, Predicted frames receive a fairly high amount of compression and are used as references for future Predicted frames. Thus, both I and P frames are used as references for subsequent frames. Bi-directional pictures include the greatest amount of compression and require both a past and a future reference in order to be encoded. Bi-directional frames are never used as references for other frames.

In general, for the frame(s) following a reference frame, i.e., P and B frames that follow a reference I or P frame, only small portions of these frames are different from the corresponding portions of the respective reference frame. Thus, for these frames, only the differences are captured, compressed and stored. The differences between these frames are typically generated using motion vector estimation logic, as discussed below.

When an MPEG encoder receives a video file or bitstream, the MPEG encoder generally first creates the I frames. The MPEG encoder may compress the I frame using an intraframe lossless compression technique. After the I frames have been created, the MPEG encoder divides respective frames into a grid of 16×16 pixel squares called macroblocks. The respective frames are divided into macroblocks in order to perform motion estimation/ compensation. Thus, for a respective target picture or frame, i.e., a frame being encoded, the encoder searches for a best fit or best match between the target picture macroblock and a block in a neighboring picture, referred to as a search frame. For a target P frame, the encoder searches in a prior I or P frame. For a target B frame, the encoder searches in a prior or subsequent I or P frame. When a best match is found, the encoder transmits a vector movement code or motion vector. The vector movement code or motion vector includes a pointer to the best fit search frame block as well as information on the difference between the best fit block and the respective target block. The blocks in target pictures that have no change relative to the block in the reference or search frame are ignored. Thus the amount of data that is actually stored for these frames is significantly reduced.

After motion vectors have been generated, the encoder then encodes the changes using spatial redundancy. Thus, after finding the changes in location of the macroblocks, the MPEG algorithm further calculates and encodes the difference between corresponding macroblocks. Encoding the difference is accomplished through a math process referred to as the discrete cosine transform or DCT. This process divides the macroblock into four sub-blocks, seeking out changes in color and brightness. Human perception is more sensitive to brightness changes than color changes. Thus the MPEG algorithm devotes more effort to reducing color space rather than brightness.

Therefore, MPEG compression is based on two types of redundancies in video sequences, these being spatial, which is the redundancy in an individual frame, and temporal, which is the redundancy between consecutive frames. Spatial compression is achieved by considering the frequency characteristics of a picture frame. Each frame is divided into non-overlapping blocks and respective sub-blocks, and each block is transformed via the discrete cosine transform (DCT). After the transformed blocks are converted to the "DCT domain", each entry in the transformed block is quantized with respect to a set of quantization tables. The quantization step for each entry can vary, taking into account the sensitivity of the human visual system (HVS) to the frequency. Since the HVS is more sensitive to low frequencies, most of the high frequency entries are quantized to zero. In this step where the entries are quantized, information is lost and errors are introduced to the reconstructed image. Zero run length encoding is used to transmit the quantized values. To further enhance compression, the blocks are scanned in a zig-zag ordering that scans the lower frequency entries first, and the non-zero quantized values, along with the zero run lengths, are entropy encoded.

As discussed above, temporal compression makes use of the fact that most of the objects remain the same between consecutive picture frames, and the difference between objects or blocks in successive frames is their position in the frame as a result of motion (either due to object motion, camera motion or both). The key to this relative encoding is motion estimation. In general, motion estimation is an essential processing requirement in most video compression algorithms. In general, motion estimation is the task of identifying temporal redundancy between frames of the video sequence.

Motion Estimation

As discussed above, in motion estimation the target frame or frame being encoded is first partitioned into non-overlapping target blocks. Each target block is compared to all overlapping candidate blocks in the reference or search frame that are in an area surrounding the target block. The candidate block that is the best fit for the target block is chosen to represent the target block. In other words, the target block is encoded with a pointer or motion vector to the "best fit" candidate block. Thus, the target block is encoded or represented at a minimal cost of a pointer to the candidate block which has already been reconstructed. In addition to the pointer, the difference between the candidate and target block (pixel by pixel subtraction) is computed, which represents the difference or error between the candidate and target block. The DCT transform is then applied to this difference or error block, and the quantized DCT image of the difference block is also included in the compressed stream.

The primary issue in a temporal motion estimation based compression scheme is finding the block in the search or reference frame which best fits the block in the target frame. Various methods exist for estimating motion vectors, including block matching. Block matching is used in the MPEG standard and is the most popular motion estimation method. Block matching compares each block of a target video frame to a plurality of candidate blocks in a reference or search window of a neighboring video frame in order to compute a motion vector. The target video frame being encoded is partitioned into equal-sized blocks, referred to as target blocks. Likewise, the neighboring or reference frame is partitioned into respective search windows or search areas for each of the target blocks which correspond to the location of the respective target block in the target frame. The search window is larger than the corresponding target block to allow the block matching method to compare the target block with different candidate blocks in the search window. Thus, block matching involves, for each target block, searching for a similar block among the candidate blocks in the search window located in the neighboring frame.

In the block matching method, the search is performed by measuring the closeness between the target block and each candidate block in the search window of a neighboring frame, and then choosing the closest match. The measure of closeness between the target block and a candidate block generally involves computing the Sum of Absolute Errors (SAE) between the two blocks, which is the sum of the absolute differences between every corresponding pixel in the two blocks. The smaller the SAE of the two blocks, the closer or better match there is between the two blocks. The measure of closeness between the target block and a candidate block may instead involve computing the sum of the squared errors between corresponding pixel values. In general, motion estimation, i.e., the process of generating motion vectors to represent movement between blocks in respective video frames, requires a large amount of processing.

Current prior art methods use pixel-based or spatial domain-based methods for finding the best candidate or reference block. As mentioned above, these pixel based methods include minimizing the sum of the squared errors between corresponding pixel values, or minimizing the sum of the absolute differences between corresponding pixel values. The latter is more computationally efficient since it does not involve multiplications. The aim of these two metrics is to minimize the mean square error (MSE) and signal to noise ratio (SNR) between the candidate or predictor block and the target block, in the hope that these metrics will find prediction blocks that result in high compression.

There are two problems with the above pixel-based approaches which both stem from the same cause. The first problem is that a block which is "close" in the spatial domain may not be close in the frequency domain, and errors or "distances" are encoded in the frequency domain. The second related problem is that it has been observed that optimizing with respect to either MSE or (P)SNR does not always produce the sought after results in subjective picture quality, i.e., the picture quality as perceived by a human observer. This can also be attributed to the fact that the optimization is not done relative to the error that is introduced. In other words, the difference between the target block and the best fit candidate block is transmitted as a DCT value, and thus the search for the best fit candidate block should optimally be performed in the DCT domain. In current methods, the optimization is done relative to pixel values, and these methods do not take into account that the HVS is more sensitive to errors in the low frequencies than in the higher frequencies. Thus there is no weighting of the errors with respect to their effect on the reconstructed image. Even if the quantization were assumed to take these weights into consideration, the best fit should be done relative to the frequency or DCT values, since this is where the error is introduced, instead of determining the best fit in the pixel or spatial domain.

One known method for providing improved motion estimation is to perform the motion estimation in the frequency domain or DCT domain. This method first converts each target block and each of the reference or candidate blocks into the frequency domain using the DCT. Motion estimation is then performed by minimizing some metric relative to the DCT domain blocks, such as minimizing the difference or error between the transformed blocks. Performing motion estimation in the frequency domain or DCT domain provides improved matching and hence improved picture quality, as well as improved compression. This is primarily due to the fact that the DCT domain error or difference can be minimized, which is the error or difference that is actually included in the compressed stream.

One problem with performing motion estimation in the DCT domain or frequency domain is that each target block and each of the reference or candidate blocks for a respective target block must be converted into the frequency domain using the DCT. This results in significantly greater computational overhead than pixel-based block matching motion estimation. This greatly increases the processing power and time required to compress or encode a video stream, e.g., to generate an MPEG stream.

Therefore, a new system and method is desired for efficiently performing motion estimation which achieves both better picture quality and better compression and is in accord with the MPEG standard. A new system and method is desired which uses a frequency domain based or DCT domain based criteria for deciding the best fit block for MPEG translational motion estimation. A new system and method is further desired which performs motion estimation in the DCT domain and which minimizes the processing overhead and encoding time required for motion estimation.

SUMMARY OF THE INVENTION

The present invention comprises a system and method for estimating motion vectors between frames of a video sequence. The present invention preferably comprises a computer system including a video encoder which receives an uncompressed video file or video bitstream and generates a compressed or encoded video stream. In the preferred embodiment, the video encoder uses MPEG encoding techniques. The MPEG encoder includes motion estimation or compensation logic according to the present invention which performs motion estimation in the frequency or DCT domain. The MPEG encoder performs motion estimation in the DCT domain with improved efficiency and reduced computational requirements according to the present invention.

The motion estimation system operates to encode a target block using pointers or motion vectors to a previously encoded block, referred to as the reference block or search block. The system first partitions the target frame into a plurality of macroblocks referred to as target blocks. The system then performs a frequency domain transform, preferably a DCT transform, on the target blocks in the target frame. The motion estimation system then selects a candidate block from the search frame, and performs a frequency domain transform on the selected candidate block. The motion estimation system uses a novel method for selecting candidate blocks which allows re-use of at least a portion of the transformed values of a prior selected candidate block.

After the candidate block is selected, the motion estimation system determines one or more "relevant" target blocks in the target frame which have a corresponding search window which includes the selected candidate block. Thus, the motion estimation system of the present invention performs block comparisons from a "reverse" perspective. In other words, conventional prior art methods of performing block matching, which are either pixel based or DCT domain based, first select a target block in the target frame and compare this target block with a plurality of candidate blocks from a search window in a search frame or reference frame. According to the preferred embodiment of the present invention, the method instead selects a candidate block in the reference or search frame and then determines the "relevant" target blocks in the target frame. The "relevant" target blocks in the target frame are those blocks whereby the respective selected candidate block would be included in the search window of that target block.

After the relevant target blocks have been selected, the system computes a distance between the transformed values of the selected candidate block and the transformed values of each of the determined target blocks. The system then determines if the computed distance is a better metric than a currently stored computed distance for each of the determined target blocks. If a better metric is found for a respective target block, the system stores the location of the selected candidate block for the respective target block. The system may also store or cache the computed distance for later re-use.

The above steps are performed for each of the possible candidate blocks in the search frame. This method thus produces or determines "best fit" candidate blocks for each of the target blocks. The system then computes motion vectors for each of the target blocks in the target frame based on these "best fit" blocks.

The method of performing the DCT transform on the selected candidate block from the search frame comprises partitioning the selected candidate block into a plurality of sub-blocks and performing the DCT transform on each of the plurality of sub-blocks. After these values are computed, the system stores the transformed values of one or more of the sub-blocks for re-use in a later computation. The system includes a novel method for selecting a candidate block from the search frame which re-uses the stored transformed values of the sub-blocks of a prior candidate block.

In the preferred embodiment, the candidate blocks and target blocks are 16×16 macroblocks comprising four 8×8 sub-blocks. The search frame is partitioned into a plurality of horizontal bands each having a vertical length equal to a vertical length of the candidate blocks. Each of the horizontal bands includes an upper portion comprising two upper sub-blocks and a lower portion comprising two lower sub-blocks. The search frame is also partitioned into a plurality of vertical strips, wherein each of the vertical strips has a horizontal width equal to a horizontal width of the candidate blocks. The preferred method of selecting candidate blocks from the search frame comprises, for each vertical strip, selecting horizontal bands in the vertical strip which re-use the transformed values of the lower two sub-blocks of a prior candidate block from a prior horizontal band. This selection method is performed to select all of the candidate blocks in the search frame. The method of the present invention also preferably selects new vertical strips which re-use transformed values of the two rightmost sub-blocks of a prior vertical strip. This reduces the computational requirements and enhances the performance of the motion estimation system.

The present invention thus performs motion estimation in the frequency or DCT domain with improved efficiency and reduced computational requirements. Therefore, the present invention provides video encoding in the DCT domain with improved performance.

BRIEF DESCRIPTION OF THE DRAWINGS

A better understanding of the present invention can be obtained when the following detailed description of the preferred embodiment is considered in conjunction with the following drawings, in which.

DETAILED DESCRIPTION OF THE PREFERRED EMBODIMENT

Video Compression System

Figure 1:
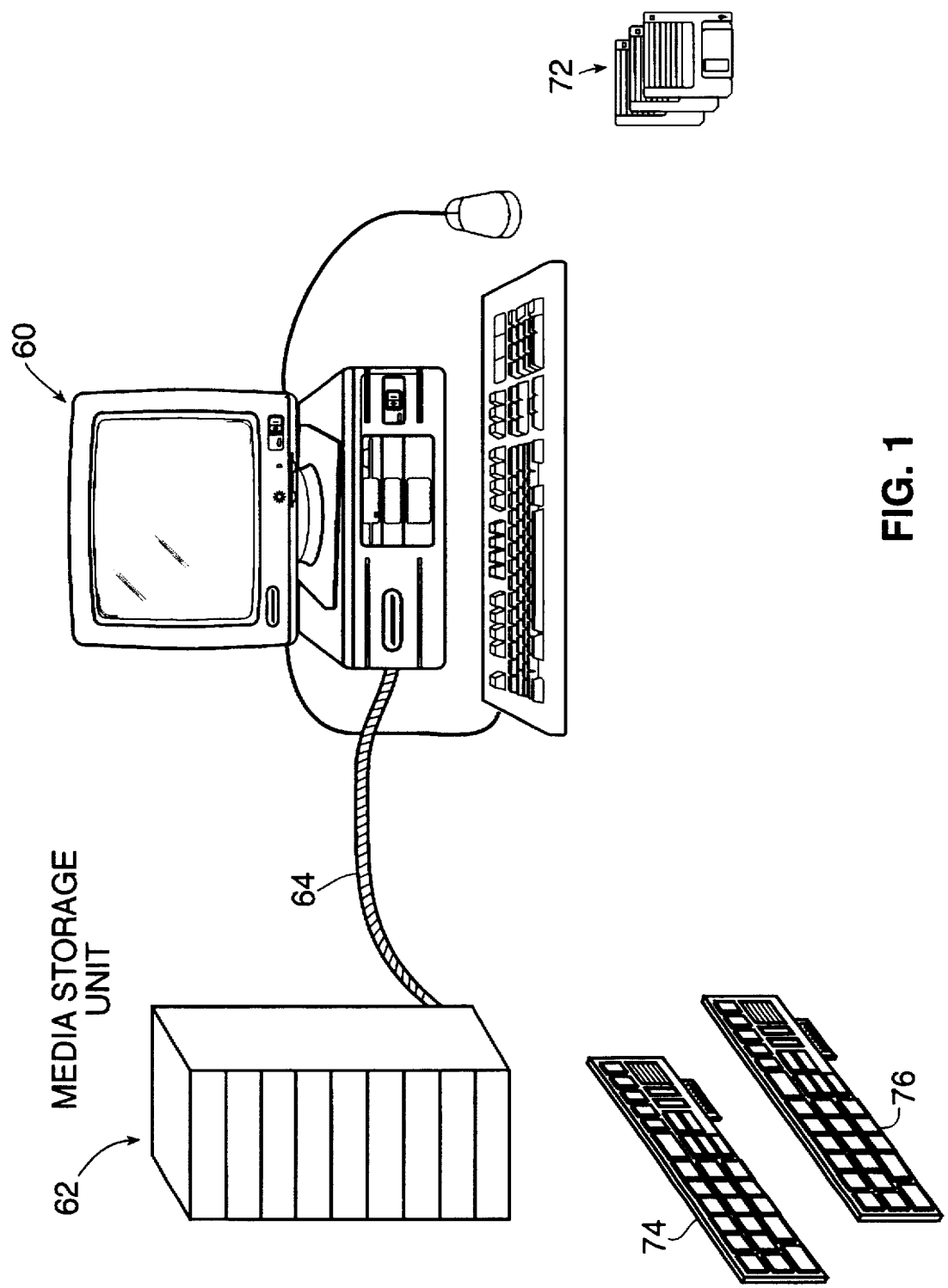
FIG. 1 illustrates a computer system which performs video compression and including a video encoder which performs motion estimation in the DCT domain according to the present invention.

Referring now to FIG. 1, a system for performing video compression including a motion estimation system according to the present invention is shown. The system of the present invention performs motion estimation between frames of a video sequence during video encoding or video compression. In other words, the system of the present invention preferably generates motion estimation vectors for use in video compression. However, the system of the present invention may be used to perform motion estimation and/or generate motion vectors for use in any of various types of applications, as desired.

As shown, in one embodiment the video compression system comprises a general purpose computer system 60. The computer system 60 is preferably coupled to a media storage unit 62 which stores digital video files which are to be compressed by the computer system 60. In the preferred embodiment, the computer system 60 receives a normal uncompressed digital video file or bitstream and generates a compressed video file. In the present disclosure, the term "uncompressed digital video file" refers to a stream of raw uncompressed video, and the term "compressed video file" refers to a video file which has been compressed according to any of various video compression algorithms which use motion estimation techniques, including the MPEG standard, among others.

As shown, the computer system 60 preferably includes a video encoder 76 which performs video encoding or compression operations. The video encoder 76 is preferably an MPEG encoder. The computer system 60 optionally may also include an MPEG decoder 74. The MPEG encoder 76 and MPEG decoder 74 are preferably adapter cards coupled to a bus in the computer system, but are shown external to the computer system 60 for illustrative purposes. The computer system 60 also includes software, represented by floppy disks 72, which may perform portions of the video compression operation and/or may perform other operations, as desired.

Figure 2:
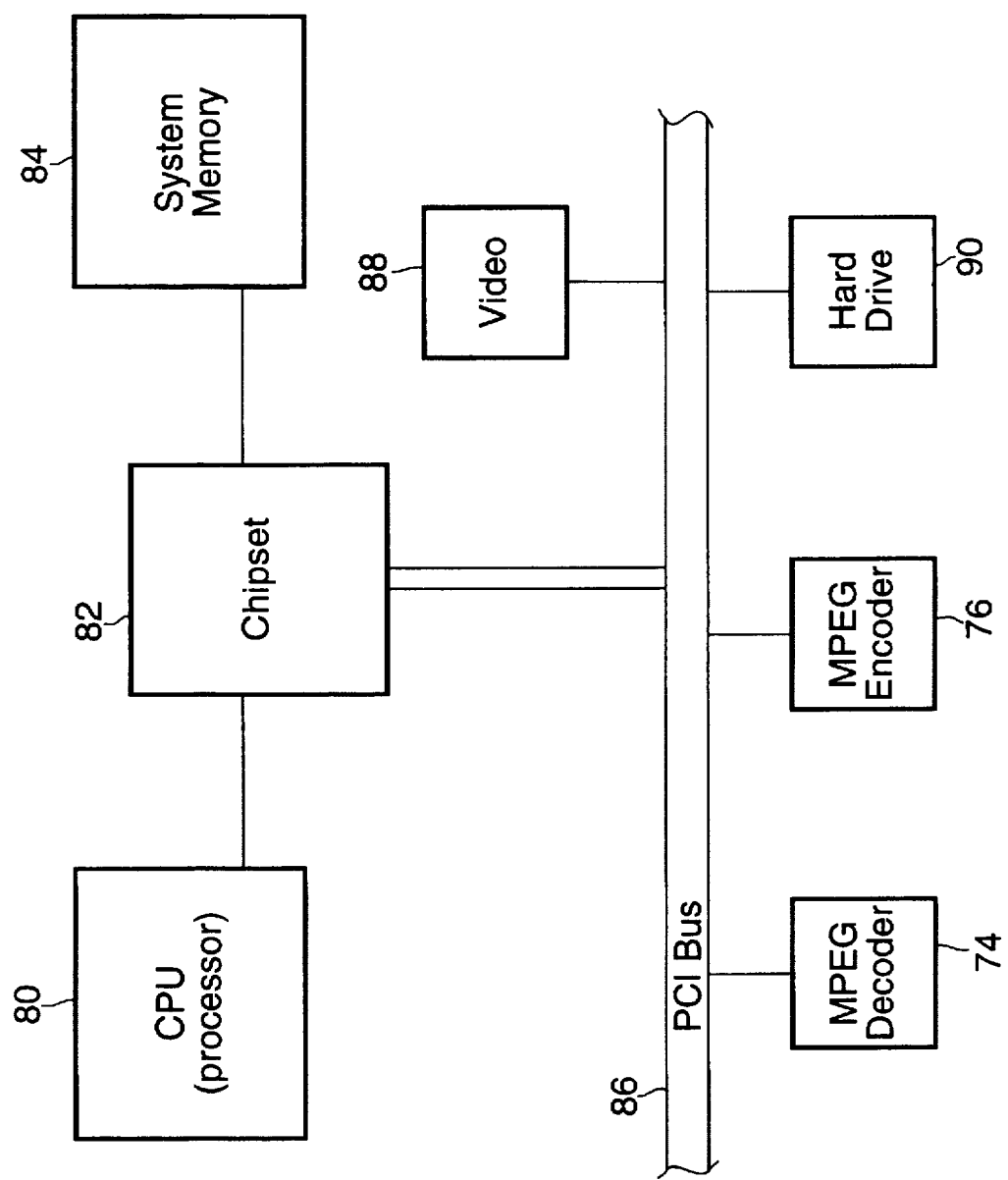
FIG. 2 is a block diagram illustrating the computer system of FIG. 1.

The computer system 60 preferably includes various standard components, including one or more processors, one or more buses, a hard drive and memory. Referring now to FIG. 2, a block diagram illustrating the components comprised in the computer system of FIG. 1 is shown. It is noted that FIG. 2 is illustrative only, and other computer architectures may be used, as desired. As shown, the computer system includes at least one processor 80 coupled through chipset logic 82 to a system memory 84. The chipset 82 preferably includes a PCI (Peripheral Component Interconnect) bridge for interfacing to PCI bus 86, or another type of bus bridge for interfacing to another type of expansion bus. In FIG. 2, MPEG decoder 74 and MPEG encoder 76 are shown connected to PCI bus 86. Various other components may be comprised in the computer system, such as video 88 and hard drive 90.

As mentioned above, in the preferred embodiment of FIG. 1 the computer system 60 includes or is coupled to one or more digital storage or media storage devices. For example, in the embodiment of FIG. 1, the computer system 60 couples to media storage unit 62 through cable 64. The media storage unit 62 preferably comprises a RAID (Redundent Array of Inexpensive Disks) disk array, or includes one or more CD-ROM drives and/or one or more Digital Video Disk (DVD) storage units, or other media, for storing digital video to be compressed and/or for storing the resultant encoded video data. The computer system may also include one or more internal RAID arrays, CD-ROM drives and/or may couple to one or more separate Digital Video Disk (DVD) storage units. The computer system 60 also may connect to other types of digital or analog storage devices or media, as desired.

Alternatively, the digital video file may be received from an external source, such as a camera or other real time device, or from a remote storage device or remote computer system. In this embodiment, the computer system preferably includes an input device, such as an ATM (Asynchronous Transfer Mode) adapter card or an ISDN (Integrated Services Digital Network) terminal adapter, or other digital data receiver, for receiving the digital video file. The digital video file may also be stored or received in analog format and converted to digital data, either externally to the computer system 60 or within the computer system 60.

As mentioned above, the MPEG encoder 76 in the computer system 60 performs video encoding or video compression functions. In performing video encoding or video compression, the MPEG encoder 76 generates motion estimation vectors between frames of the digital video file. As discussed further below, the MPEG encoder 76 in the computer system 60 performs motion estimation in the frequency domain or DCT domain with improved efficiency and reduced computational requirements according to the present invention.

It is noted that the system for encoding or compressing video data may comprise two or more interconnected computers, as desired. The system for encoding or compressing video data may also comprise other hardware, such as a set top box, either alone or used in conjunction with a general purpose programmable computer. It is noted that any of various types of systems may be used for encoding or compressing video data according to the present invention, as desired.

Figure 3:
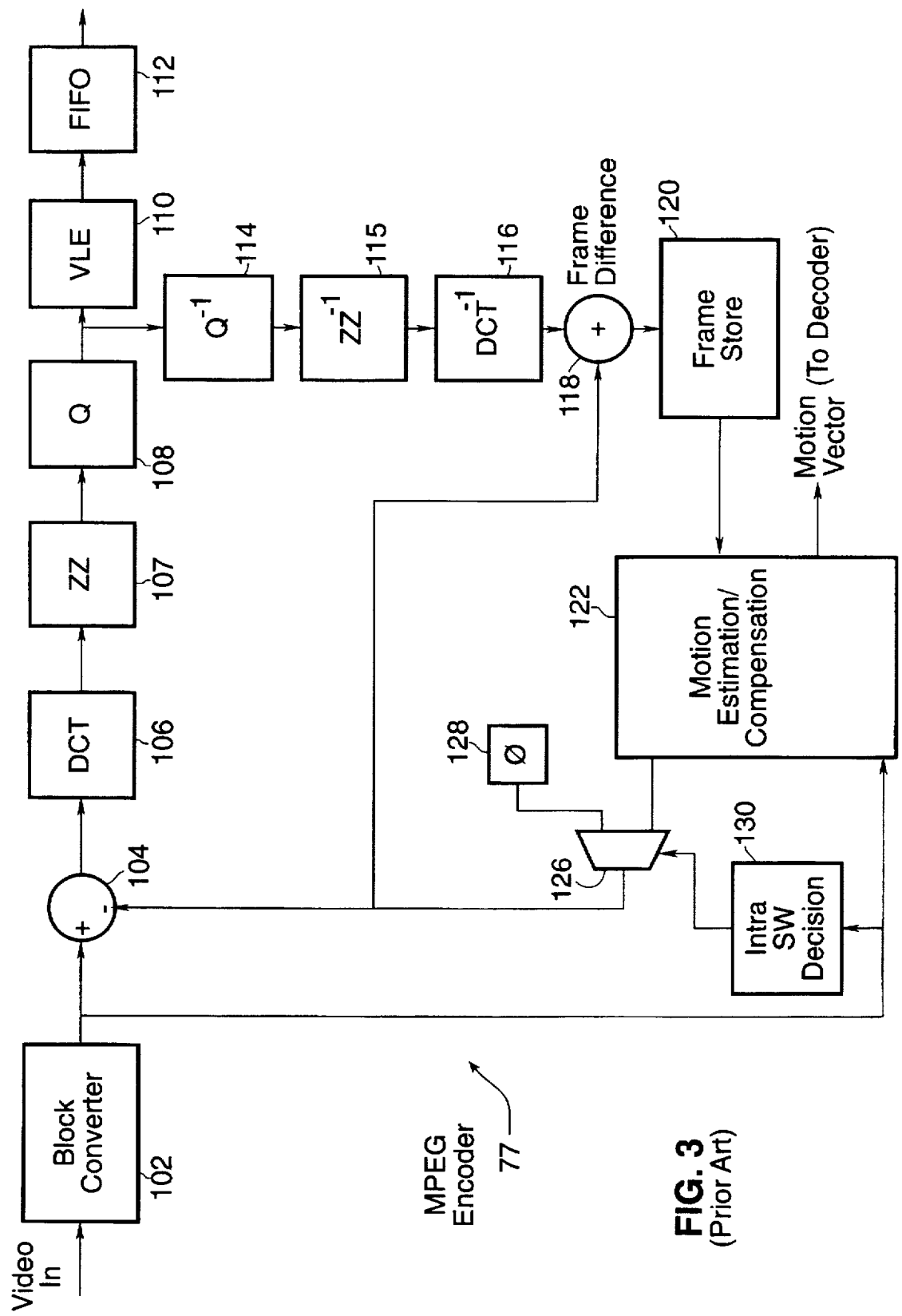
FIG. 3 is a block diagram illustrating an MPEG encoder according to the prior art.

FIG. 3—Prior Art MPEG Encoder Block Diagram

Referring now to FIG. 3, a block diagram illustrating an MPEG encoder 77 which performs motion estimation according to the prior art is shown. As shown, the video encoder 77 receives an uncompressed digital video stream and outputs an encoded stream. The uncompressed digital video stream is a bitstream of video data which is used to present a video sequence, such as a television segment or movie, onto a screen, such as a television or a computer system. In the preferred embodiment, the video encoder 77 compresses the uncompressed digital video stream using the MPEG-2 compression algorithm.

As shown in FIG. 3, a block converter 102 converts input luminance and chrominance video signals to block format, where each block preferably comprises an 8×8 matrix of 64 pixel values. The block format is preferably implemented as a plurality of macroblocks grouped into particular spacing formats depending upon the particular type of encoding system, such as the standard 4:4:4, 4:2:2, 4:2:0 etc. spacing formats, for example. The block converter 102 provides sequential pixel values to a subtractor 104 and to motion estimation/compensation logic 122, described further below. The block converter 102 also provides an output to an Intra-SW decision block 130.

The subtractor 104 receives an input from a multiplexer 126 and operates to subtract the output of the multiplexer 126 from the output of the block converter 102. The multiplexer 126 receives inputs from the motion estimation/compensation logic 122 and also receives a 0 input from block 128. The multiplexer 126 receives a select input from the Intra-SW decision block 130. The Intra-SW decision block 130 determines whether an interfield or intrafield mode is being used. In the interfield data mode, the multiplexer 126 provides the output from the motion estimation/compensation block 122, and the subtractor 102 subtracts each block of a macroblock provided by motion estimation/compensation logic 122 from a corresponding block provided from the block converter 102. In the intrafield data mode, the multiplexer 126 provides an output from the zero block 128, and thus the blocks from the block converter 102 pass through the subtractor 104 unmodified.

The subtractor 104 provides output blocks of motion-predicted, differentially encoded macroblocks (intermode) or unmodified output blocks (intramode) to a DCT converter 106. The DCT converter 106 converts each of the blocks to DCT format, resulting in corresponding 8×8 blocks of DCT coefficients. The DCT format expresses the data in the frequency domain for enabling compression of video data. For each DCT block, the first or top left coefficient typically comprises the DC component of the block, and the remaining values are AC components for increasing vertical and horizontal frequencies.

The DCT coefficients from the DCT converter 106 are provided to a ZZ block 107 which re-orders the pixels in a zig zag format. The output of the ZZ block 107 is provided to a quantizer 108, which maps sets of coefficient values into a quantized value. Smaller sets are typically used for the lower-frequency coefficients, i.e., fine quantization, than for the higher-frequency coefficients, since the human eye is less sensitive to image components at higher spatial frequencies than to components at lower spatial frequencies.

The data values from the quantizer 108 are provided to a variable length encoder (VLE) 110 for encoding the data for purposes of storage and/or transmission. The VLE 110 scans and converts the blocks of data to variable length codes (VLCs) according to the principles of entropy coding, where shorter codes are allocated to the more probable values to achieve coding gain and thus compression of the data. One such VLC coding scheme is referred to as Huffman coding, although other coding schemes are contemplated. The VLCs are provided from the VLE 110 to a first-in first-out (FIFO) buffer 112.

For the interfield mode, the data values from the quantizer 108 are provided to an inverse quantizer 114 for reversing the operation performed by the quantizer 108 to produce approximate DCT coefficients representing each block of the encoded image. Since quantization is usually a lossy process, the output of the inverse quantizer 114 introduces noise and errors.

The output data of the inverse quantizer 114 is provided to an inverse ZZ block 115 which reverses the operation of the ZZ block 107. The output of the inverse ZZ block 115 is provided to an inverse DCT (IDCT) converter 116 for reversing the operation performed by the DCT converter 106. The frame difference blocks at the output of the IDCT converter 116 are provided to one input of a two-input adder 118. The adder 118 also receives the output data blocks from the motion compensation logic 122. The output pixel values from the adder 118 are provided to a frame store memory 120, where the stored data may be provided to a video buffer (not shown) and displayed on a display device (not shown), such as a monitor.

The values in the frame store memory 120 are provided to the input of the motion estimation/compensation logic 122. In general, the motion estimation/compensation logic 122 compares the incoming block from the block converter 102 with the reconstructed previous block stored in the frame store memory 120 to measure motion in the form of motion vectors. The motion estimation/compensation logic 122 of FIG. 3 performs motion estimation in the spatial domain using prior art techniques.

The motion estimation/compensation logic 122 shifts objects or blocks to estimated positions in the new frame, resulting in predicted blocks. In the interfield mode, this predicted block is then subtracted from the input block to obtain a block difference or prediction error. This process separates interframe redundancy and the prediction error. In the interfield mode, the block difference is then processed by the DCT converter 106, ZZ block 107, and the quantizer 108 to remove spatial redundancy. Thus, in this prior art method, motion estimation is performed in the spatial or pixel domain, and the frame difference is then DCT transformed and quantized.

Figure 4:
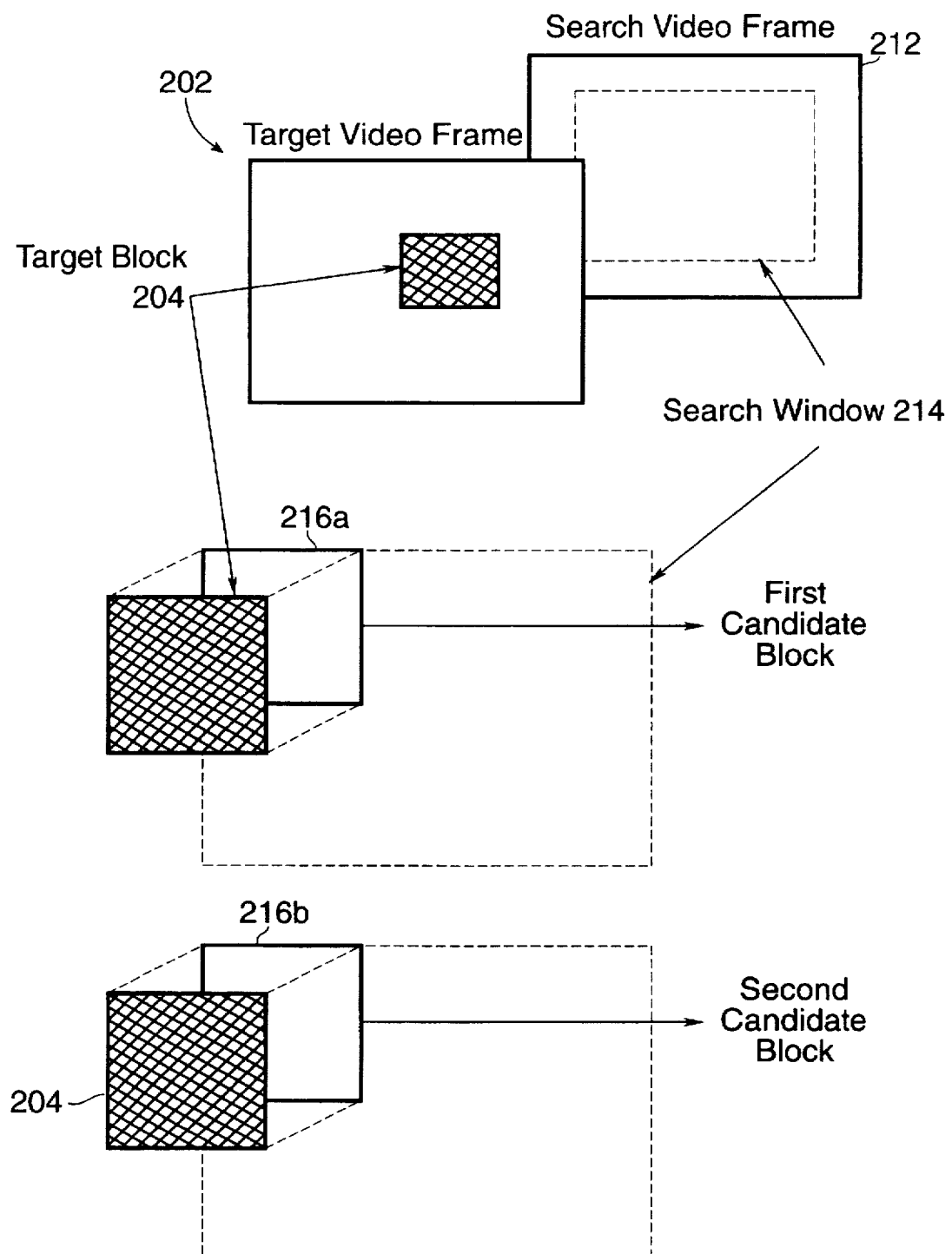
FIG. 4 illustrates operation of block matching motion estimation between a reference frame and a search frame, wherein a reference block in the reference frame is swept across various candidate blocks in a search window of the search frame according to the prior art.

FIG. 4—Prior Art Spatial Domain Block Matching Motion Estimation

As discussed above, most video compression algorithms perform pixel-based block matching motion estimation in the spatial domain to identify temporal redundancy between frames of the video sequence. The motion estimation computation computes motion estimation vectors between one or more blocks in a target frame and a corresponding one or more blocks in a neighboring or search frame in order to estimate the motion or change of the blocks between the target frame and the neighboring or search frame.

In general, block matching is the most popular motion estimation method and is used in the MPEG standard. FIG. 4 illustrates operation of the block matching motion estimation method. More particularly, FIG. 4 illustrates a target video frame 202 and a search video frame 212. The target video frame 202 is partitioned into equal-sized target blocks, such as target block 204. The search video frame 212 is partitioned into respective search windows or search areas for each of the target blocks. Search window 214 corresponds to target block 204. The center point or location of a respective search window 214 preferably corresponds to the center point or location of the target block 204 in the target frame 202. As shown, the search window 214 is larger than the target block 204 and is preferably centered in location relative to the respective target block 204.

The search window 214 is larger than the target block 204 to allow the target block 204 to be compared with multiple "candidate" blocks 216 in the search window 214. Thus, the search window 214 is partitioned into a plurality of candidate blocks 216 which have the same size as the target block 204. Block matching compares the pixels of a respective target block 204 of a target video frame 202 to the pixels of a plurality of candidate blocks 216 in the search window 214 of a search video frame 212 in order to determine the closest match and hence compute the motion vector between the two blocks for the respective frames. Thus, block matching involves, for each target block 204, searching for a similar block among the candidate blocks 216 in a search window or search area 214 located in the neighboring frame, referred to as the search video frame 212.

In the block matching method, the search is performed by measuring the closeness between the target block 204 and each candidate block 216 in the search window 214 of the respective search video frame 212, and then choosing the closest match. The measure of closeness between the target block 204 and a candidate block 216 generally involves computing the Sum of Absolute Errors (SAE) between the two blocks, which is the sum of the absolute differences between every corresponding pixel in the two blocks. The smaller the SAE of the two blocks, the closer or better match there is between the two blocks. Another measure of closeness is to compute the sum of squared errors between the blocks.

As shown in FIG. 4, the target block 204 is compared to different candidate blocks 216 in the search window 214 of the search video frame 212. FIG. 4 illustrates the target block 204 and only two of the candidate blocks 216 of the search window 214. The target block 204 is effectively moved across the search window 214 by displacements of one pixel at a time in the horizontal and the vertical directions. At each of these positions, the "distance" between the target block 204 and the candidate block 216 is computed, wherein the distance is either the SAE or sum of squared errors. The candidate block 216 that results in the minimum distance among all the values is chosen as the match for the target block 204.

Thus, for each target block 204 in a target frame 202, the task of motion estimation comprises an exhaustive computation of SAE's or sum of squared errors for each of the candidate blocks 216 in the respective search window 214 to achieve distance values for each candidate block 216. After these distance values have been computed, the method then chooses the candidate block 216 with the minimum distance.

Figure 5:
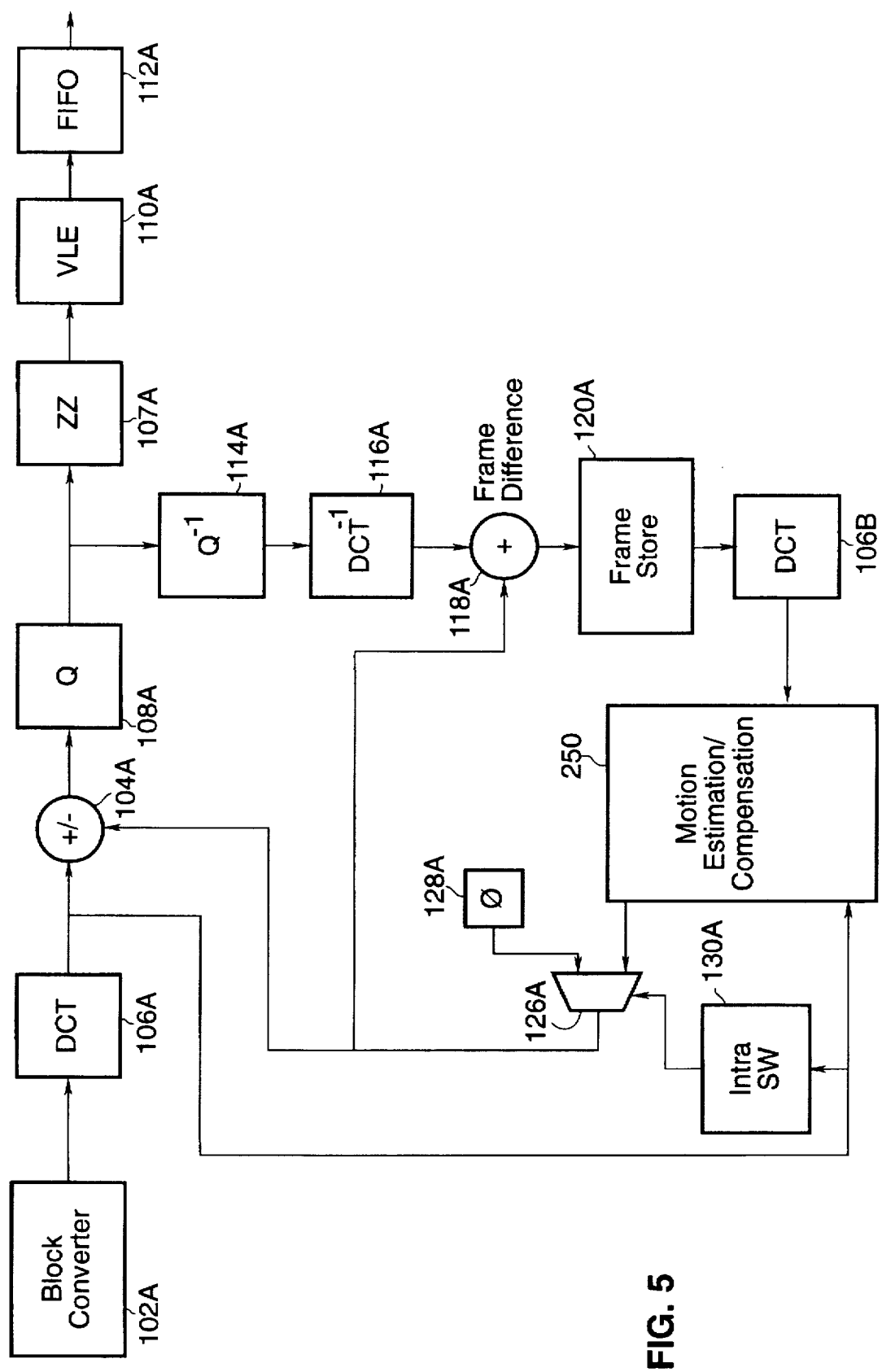
FIG. 5 is a block diagram illustrating one embodiment of an MPEG encoder according to the present invention.

FIG. 5—MPEG Encoder Block Diagram of the Present Invention

Referring now to FIG. 5, a block diagram illustrating the MPEG encoder 76 which performs motion estimation according to the present invention is shown. In one embodiment, the MPEG encoder 76 includes the architecture shown in FIG. 3, and the motion estimation/compensation logic 122 includes DCT transform and quantization blocks and performs motion estimation in the DCT domain according to the present invention. In the preferred embodiment of FIG. 5, the MPEG encoder 76 includes a different architecture to perform motion estimation in the frequency domain or DCT domain according to the present invention. Elements in FIG. 5 which are similar or identical to elements in FIG. 3 have the same reference numerals with an appended A or B.

As shown, the video encoder 76 receives an uncompressed digital video stream and outputs an encoded stream. The uncompressed digital video stream is a bitstream of video data which is used to present a video sequence, such as a television segment or movie, onto a screen, such as a television or a computer system. In the preferred embodiment, the video encoder 76 compresses the uncompressed digital video stream using the MPEG-2 compression algorithm. Other types of compression may be used, as desired.

As shown in FIG. 5, block converter 102A converts input luminance and chrominance video signals to block format, where each block preferably comprises an 8×8 matrix of 64 pixel values. The block format is preferably implemented as a plurality of macroblocks grouped into particular spacing formats depending upon the particular type of encoding system, such as the standard 4:4:4, 4:2:2, 4:2:0 etc. spacing formats, for example.

The block converter 102A provides sequential pixel values to a DCT converter 106A. The DCT converter 106A converts each of the blocks to DCT format, resulting in corresponding 8×8 blocks of DCT coefficients. The DCT format expresses the data in the frequency domain to enable compression of the video data. For each DCT block, the first or top left coefficient typically comprises the DC component of the block, and the remaining values are AC components for increasing vertical and horizontal frequencies.

The DCT coefficients from the DCT converter 106A are provided to a subtractor 104A and to motion estimation/compensation logic 250 according to the present invention, described further below. The DCT block 106A also provides an output to an Intra-SW decision block 130A. The motion estimation/compensation logic 250 in FIG. 5 differs from the motion estimation/compensation logic 122 of FIG. 3, wherein the motion estimation/compensation logic 250 in FIG. 5 performs motion estimation on DCT transformed values with reduced computational requirements according to the present invention.

The subtractor 104A receives an input from a multiplexer 126A and operates to subtract the output of the multiplexer 126A from the output of the DCT block 106A. The multiplexer 126A receives inputs from the motion estimation/compensation logic 250 and also receives a 0 input from block 128A. The multiplexer 126A receives a select input from the Intra-SW decision block 130A. The Intra-SW decision block 130A determines whether an interfield or intrafield mode is being used. In the interfield data mode, the multiplexer 126A provides the output from the motion estimation/compensation block 250, and the subtractor 104A subtracts each block of a macroblock provided by motion estimation/compensation logic 250 from a corresponding block provided from the DCT block 106A. In the intrafield data mode, the multiplexer 126A provides an output from the zero block 128A, and thus the blocks from the DCT block 106A pass through the subtractor 104A unmodified.

The subtractor 104A outputs the error term of the DCT transform block after prediction. The data values from the subtractor 104A are provided to a quantizer 108A, which maps sets of coefficient values into a quantized value. Smaller sets are typically used for the lower-frequency coefficients, i.e., fine quantization, than for the higher-frequency coefficients, since the human eye is less sensitive to image components at higher spatial frequencies than to components at lower spatial frequencies.

The output of the quantizer 108A is provided to a ZZ block 107A which re-orders the pixels in a zig zag or diagonal format. The output of the ZZ block 107A is provided to a variable length encoder (VLE) 110A for encoding the data for purposes of storage and/or transmission. The VLE 110A scans and converts the blocks of data to variable length codes (VLCs) according to the principles of entropy coding, where shorter codes are allocated to the more probable values to achieve coding gain and thus compression of the data. One such VLC coding scheme is referred to as Huffman coding, although other coding schemes are contemplated. The VLCs are provided from the VLE 110A to a first-in first-out (FIFO) buffer 112A.

For I and P frames, the data values from the quantizer 108A are provided to an inverse quantizer 114A for reversing the operation performed by the quantizer 108A to produce approximate DCT coefficients representing each block of the encoded image. Since quantization is usually a lossy process, the output of the inverse quantizer 114A introduces noise and errors.

The output data of the inverse quantizer 114A is provided to an inverse DCT (IDCT) converter 116A for reversing the operation performed by the DCT converter 106A. The frame difference blocks at the output of the IDCT converter 116A are provided to one input of a two-input adder 118A. The adder 118A also receives the output data blocks from the multiplexer 126A, which are from the motion estimation/compensation logic 250. The output pixel values from the adder 118A are provided to a frame store memory 120A.

The values in the frame store memory 120A are provided to the input of a DCT block 106B which performs the DCT transform on the values. The DCT block 106B provides its outputs to the motion estimation/compensation logic 250. It is noted that the DCT block 106B is similar or identical to the DCT block 106A. It is also noted that the DCT block 106B is an additional element in the embodiment of FIG. 8 which is not included in the prior art embodiment of FIG. 3.

In general, the motion estimation/compensation logic 250 compares the DCT transformed values of the incoming frame from the DCT block 106A, referred to as the target frame, with the DCT transformed values of the reconstructed previous frame output from the DCT block 106B, to measure motion in the form of motion vectors. The motion estimation/compensation logic 250 performs motion estimation in the frequency domain or DCT domain according to the present invention.

The motion estimation/compensation logic 250 shifts objects or blocks to estimated positions in the new frame, resulting in predicted blocks. In the interfield mode, this predicted block is then subtracted from the input block to obtain a block difference or prediction error. This process separates interframe redundancy and the prediction error. In the interfield mode, this frame difference or prediction error has already been DCT transformed to remove spatial redundancy.

Thus, in the encoder of the present invention, the motion estimation is performed on DCT transformed values. The motion estimation/compensation logic 250 performs motion estimation in the frequency domain or DCT domain with improved performance and reduced computational requirements according to the present invention, as discussed below.

As discussed further below, the motion estimation/compensation logic 250 preferably comprises a means for selecting a candidate block from the search frame, a means for determining one or more relevant target blocks in the target frame, a means for computing a distance between the transformed values of the selected candidate block and the transformed values of each of the one or more determined target blocks, a means for determining if the computed distance is a better metric than a currently stored computed distance for each of the one or more determined target blocks, and also a memory for storing a location of the selected candidate block for a respective target block if the computed distance for the respective target block is a better metric than the current best computed distance for the respective target block. It is noted that each of these means may be implemented in discrete logic, or one or more of these means may be implemented as a programmable DSP or CPU, as desired. The operation of these means is described in the flowchart below.

Figure 6:
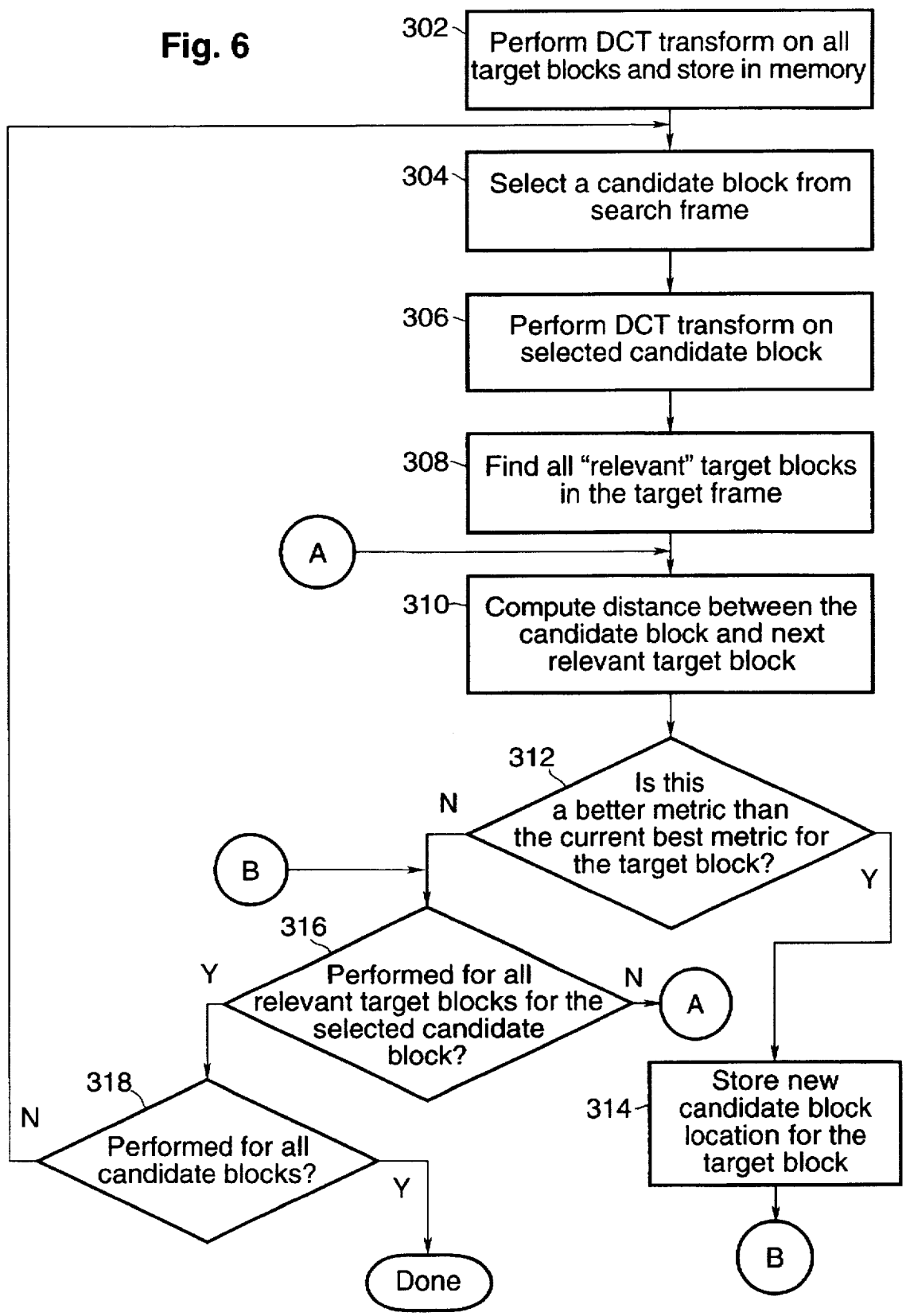
FIGS. 6 and 7 are flowchart diagrams illustrating operation of the present invention.
Figure 7:
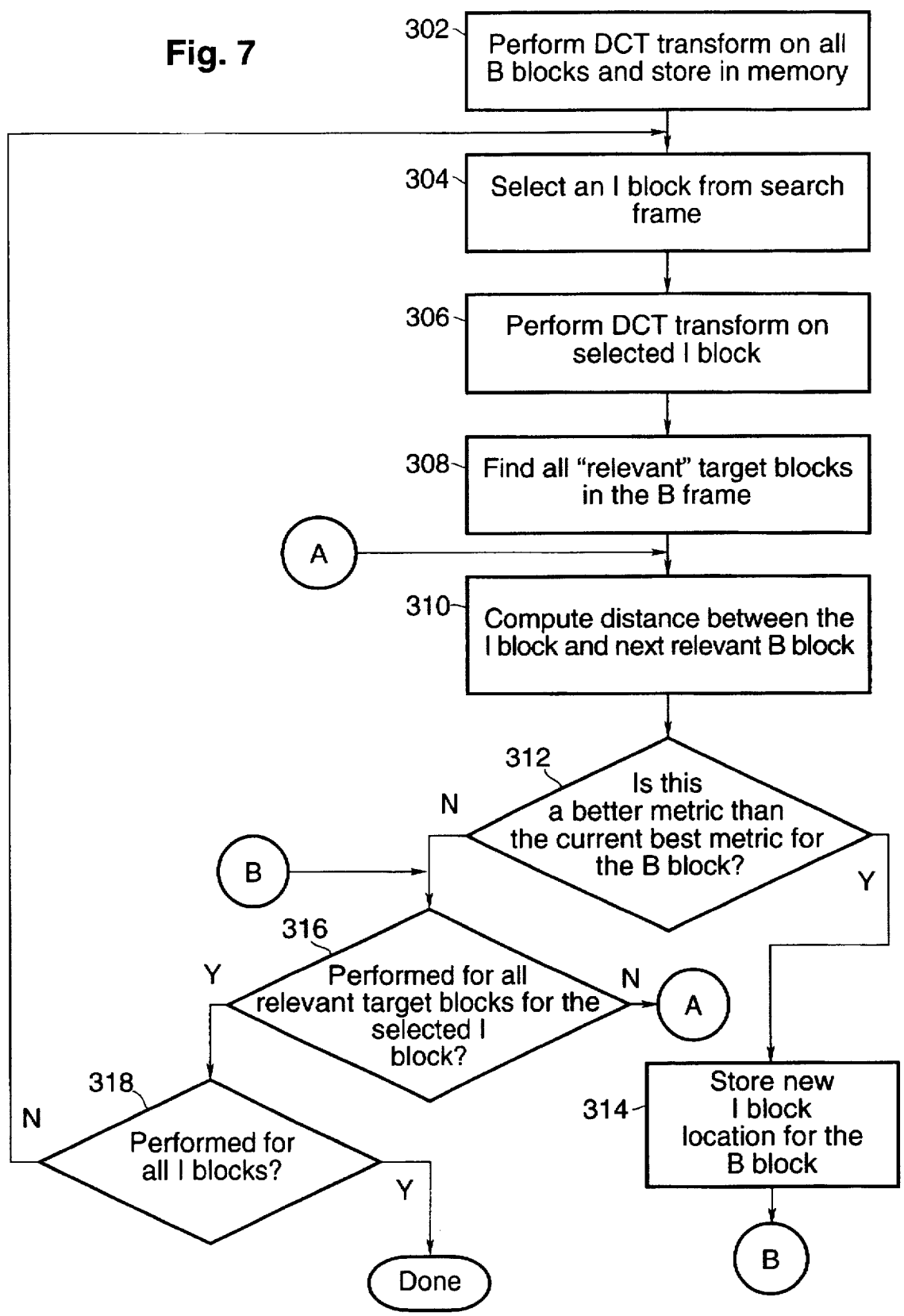

FIG. 6—Flowchart Diagram of Motion Estimation in the DCT Domain According to the Preferred Embodiment Referring now to FIG. 6, a flowchart diagram illustrating operation of the motion estimation system of the present invention is shown. The method of FIG. 6 is preferably implemented in dedicated logic or by one or more programmable DSPs. Here, it is assumed that the motion estimation system desires to encode a target frame, where the target frame is partitioned into one or more target blocks. The motion estimation system desires to encode each of the one or more target frame blocks according to a corresponding block in a search frame or reference frame. As one example, the motion estimation system is encoding motion vectors for a P frame relative to a prior I or P frame. As another example, the motion estimation system is encoding a B frame relative to a prior or subsequent I or P frame. FIG. 7 illustrates a flowchart diagram similar to the diagram of FIG. 6, where the target frame is a B frame and the search frame is an I frame.

Figure 8:
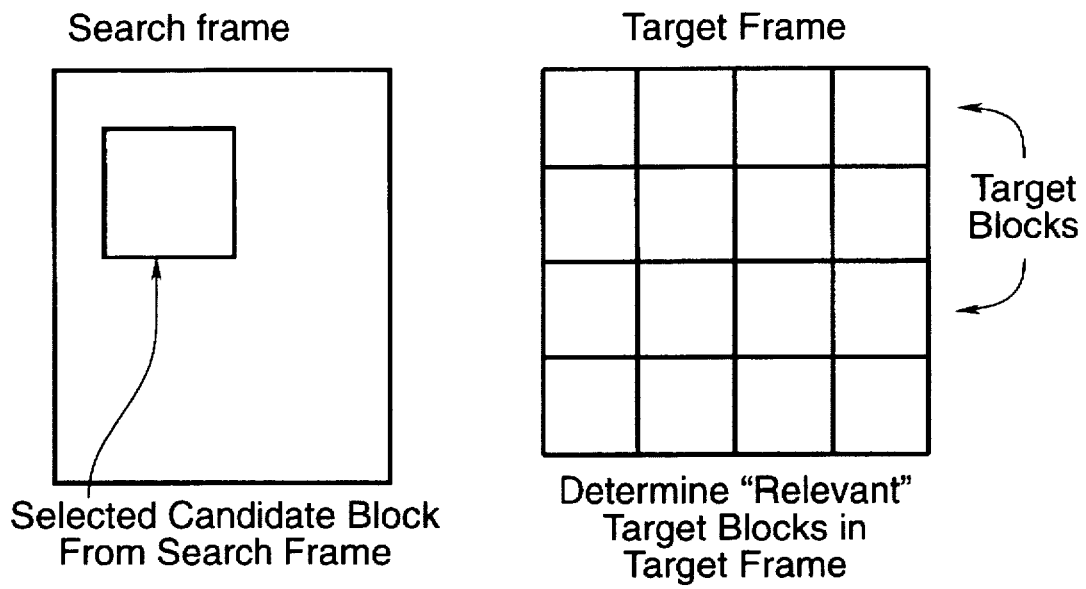
FIG. 8 illustrates a candidate block in a search frame and target blocks in a target frame.

As shown, in step 302 the motion estimation system performs a frequency domain transform on all of the target blocks in the target frame. The target blocks in a target frame are illustrated in FIG. 8. The motion estimation system also stores the transformed target blocks into a memory in step 302. In the preferred embodiment, the system performs the DCT transform on the target blocks to produce the resulting values. Since the DCT transform is well known in the art, details of its operation are omitted for simplicity.

In step 304 the system selects a candidate block from the reference frame or search frame. The candidate block is preferably an I or P frame block which is being used as a reference or predictor for a subsequent P frame block or a prior or subsequent B frame block. As discussed further below, the present invention includes an improved method of selecting candidate blocks which reduces the computational requirements of the motion estimation system 250. This selection method for candidate blocks provides optimum re-use of the DCT transform values of previously selected candidate blocks. The method of selecting candidate blocks is discussed further with respect to FIGS. 9–16.

In step 306 the motion estimation system performs the DCT transform on the candidate block selected in step 304. At least a portion of the transformed values are also preferably saved to allow these values to be re-used for subsequent candidate blocks, as discussed further below.

In step 308 the motion estimation system finds all of the "relevant" target blocks in the target frame for the selected candidate block from the reference or search frame. Thus, the motion estimation system of the present invention performs block comparisons from a "reverse" perspective, as shown in FIG. 8. In other words, conventional prior art methods of performing block matching, which are either pixel based or DCT domain based, first select a target block in the target frame and compare this target block with a plurality of candidate blocks from a search window in a search frame or reference frame. This is done for each of the target blocks in the target frame.

In the preferred embodiment where the block comparisons are performed in the DCT domain, this prior art method would result in a large amount of redundancy of DCT computations for each of the candidate blocks. According to the preferred embodiment of the present invention, the method instead selects a candidate block in the reference or search frame and then determines the "relevant" target blocks in the target frame. The "relevant" target blocks in the target frame are those blocks whereby the respective candidate block selected would be included in the search window of that target block. Thus, finding the "relevant" target blocks in the target frame in step 308 comprises, for the respective selected candidate block, determining which target blocks have a corresponding search window which would include this selected candidate block. This is the reverse procedure from that normally performed in the prior art, whereby a target block is selected and all of the candidate blocks in a search window of the search frame are determined and compared with that one selected target block.

In the preferred embodiment where macroblocks have a size of 16×16 pixels, and where the search window is +/−16 pixels relative to the macroblock, the number of relevant target blocks in the target frame will generally be either 4, 6, or 9, depending upon the position of the selected candidate block. It is noted that the number of relevant target blocks is a function of the macroblock size and the search area. The manner of determining the relevant target blocks is discussed further below with respect to FIGS. 17 and 18.

In step 310 the motion estimation system computes the "distance" between the selected candidate block and one of the relevant target blocks found in step 308. It is noted that step 310 is performed a plurality of times for each of the relevant target blocks. The distance may be computed in step 310 in a number of ways. In the preferred embodiment, the motion estimation system computes the absolute difference of the DCT values in the selected candidate block and the respective target block. In this embodiment, the system subtracts the transformed values of the selected candidate block from the transformed values of the respective determined target block. This subtracting produces a matrix for each of the one or more determined target blocks. The system then performs a partial quantization and determines the number of zeros in the matrix for the respective determined target block.

In an alternate embodiment, the motion estimation system computes the absolute difference of the DCT values in the selected candidate block and the respective target block, quantizes the results, and then encodes this quantized difference matrix into a number of bits. The system then determines the number of bits required to transmit this encoded difference for each candidate block, and then selects the candidate block which requires the least number of bits. It is noted that this latter method of selecting the candidate block which requires the least amount of encoded bits provides the optimum choice of candidate block at the expense of increased computational requirements.

In step 312 the motion estimation system determines if the computed distance for a respective target block forms a better metric than the current best metric stored for that target block. If the distance computed in step 310 is determined to be a better metric than the current best metric for the respective target block in step 312, then this new candidate block location is stored in step 314. Upon completion of step 314, operation advances to step 316.

Thus, for a respective target block, if a prior selected candidate block in a prior iteration of this flowchart, which is within the search window of the respective target block, has a certain distance, and the distance between the current selected candidate block and the respective target block comprises a better metric than the best metric currently stored for the respective target block, then the location of this new or currently selected candidate block which has the best metric is stored in step 314 for that respective target block. In the preferred embodiment, the actual difference value (distance value) is also stored in a temporary buffer or cache so that this difference does not have to be recalculated at a later time. Upon completion of step 314, operation then advances to step 316.

If the distance computed in step 310 is not a better metric than the current best metric stored for the respective target block in step 312, then operation proceeds directly to step 316. In step 316 the system determines if the above steps have been performed for all of the relevant target blocks for the selected candidate block. If not, then the system returns to step 310 and repeats steps 310–316. If the above steps have been performed for all of the relevant target blocks for the selected candidate block, then the system advances to step 318.

In step 318 the system determines if the above steps have been performed for all of the possible candidate blocks in the reference frame or search frame. If so, then operation completes. In this instance, a "best fit" candidate block has been selected for each target block. If not all of the candidate blocks in the search frame have been determined to be selected in step 316, then operation returns to step 304 and the above steps repeat.

Thus, for a respective target block, the comparison of this target block with all of the respective candidate blocks in a search window of the search frame is not performed until all of the relevant candidate blocks which are within that search window have been selected and the operations performed in steps 304–318. Thus, once all of the candidate blocks in the neighborhood or search window of a respective target block have been considered, then the candidate block with the best metric or least distance relative to the target block has been determined. Thus, a pointer or motion vector can be generated which provides the best fit or best match between the respective target block in the target frame and the candidate block in the search frame.

FIGS. 9 and 10—Partition of a frame into bands and strips

In the following description, a frame size of 64×64 pixels is used for explanatory purposes. It is noted that the present invention may be used with any of various frame sizes, as desired. In the preferred embodiment of the present invention, the motion estimation system 250 selects a candidate block in step 304 which re-uses transformed values of a prior candidate block which has been previously computed. This reduces the number of DCT transforms required to perform block matching motion estimation in the DCT domain according to the present invention.

Figure 8A:
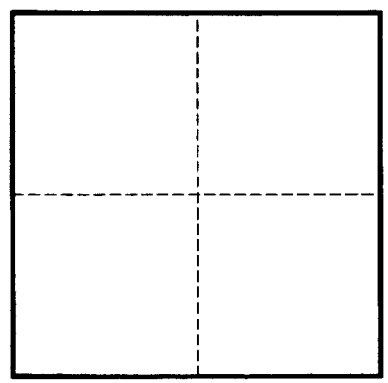
FIG. 8a illustrates a macroblock partitioned into four sub-blocks.

In the preferred embodiment, the target blocks are 16×16 macroblocks, and each of the candidate blocks are also 16×16 macroblocks. FIG. 8A illustrates a macroblock partitioned into four 8×8 sub-blocks. Thus, each of the 16×16 macroblocks can be partitioned as four 8×8 sub-blocks, comprising two upper sub-blocks and two lower sub-blocks. Thus, motion estimation is performed between a 16×16 target macroblock and a plurality of 16×16 candidate blocks. The DCT transform is performed on a 16×16 macroblock by performing the DCT transform individually on each of the four 8×8 sub-blocks comprising the macroblock.

Figure 9A:
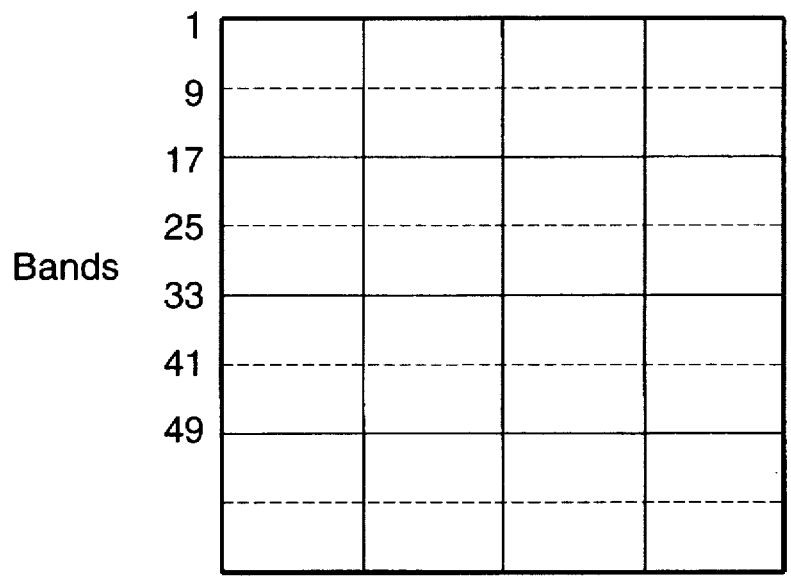
FIGS. 9a and 9b illustrate bands and strips, respectively, in a reference frame.

Referring now to FIG. 9a, the search frame can be considered as a plurality of horizontal bands, wherein each horizontal band comprises a plurality of consecutive rows of pixels, or a plurality of consecutive rows of DCT transformed values. In the preferred embodiment, each of the bands has a vertical length or number of rows which is equal to the length or number of rows of the target block and the respective candidate blocks. Thus, each of the horizontal bands has a vertical length of 16 pixels or rows.

FIG. 9a illustrates some of the bands within a search frame. The numbers on the left of the search frame in FIG. 9a identify respective bands in the search frame. Band 1 begins at the top of the search frame and has a vertical length of 16 rows or pixels. Thus, band 1 comprises the uppermost macroblocks of the search frame. Although not identified in FIG. 9a, band 2 begins one pixel row down from band 1 and comprises pixel rows 2–17. Band 3 begins three pixel rows down and comprises pixel rows 3–18, and so on.

Figure 9B:
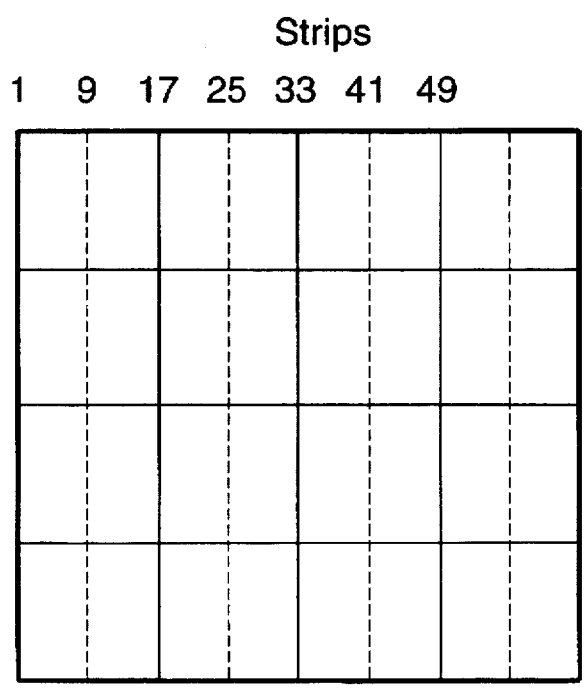

The dashed lines shown in FIG. 9a represent mid-way points between each of the macroblocks. In other words, the dashed lines represent sub-block boundaries, which are 8 pixel rows downward from the top of the respective macroblock. Thus, the first dashed line is shown beginning with pixel row 9, the second dashed line is shown beginning at pixel row 25, and so on. Thus, band number 9 begins at pixel row number 9, which is at the half-way point in the first macroblock, and has a vertical length of 16. Thus, the band identified as 9 comprises pixel rows 9–24. As shown, band 17 begins at the start of a second macroblock from the top and comprises pixel rows 17–32. Thus, in the embodiment of FIG. 9a where the search frame has a vertical length of 64 pixels, i.e., four macroblocks, a total of 49 possible bands exist within a search frame. Referring now to FIG. 9b, the search frame can also be considered as a plurality of vertical strips, wherein each vertical strip comprises a plurality of consecutive columns of pixels, or a plurality of consecutive columns of DCT transformed values. In the preferred embodiment, each of the strips has a horizontal width or number of columns which is equal to the width or number of columns of the target block, which is also equal to the width of the respective candidate blocks. Thus, where the target macroblock and the candidate blocks are 16×16 blocks, each of the strips has a width of 16 pixels or 16 columns.

FIG. 9b illustrates some of the strips within a search frame. The numbers on the top of the search frame in FIG. 9b identify respective strips in the search frame. Thus, strip 1 begins at the top left of the search frame and has a horizontal width of 16 columns or pixels. Thus, strip 1 comprises the leftmost macroblocks of the search frame. Although not identified in FIG. 9b, strip 2 begins one pixel column across from strip 1 and comprises pixel columns 2–17. Strip 3 begins three pixel columns across and comprises pixel columns 3–18, and so on.

The dashed lines shown in FIG. 9b represent mid-way points between each of the macroblocks. In other words, the dashed lines represent sub-block boundaries, which are 8 pixel columns across from the left of the respective macroblock. Thus, the first dashed line is shown beginning with pixel column 9, the second dashed line is shown beginning at pixel column 25, and so on. Thus, strip number 9 begins at pixel column number 9 on a sub-block boundary, which is at the half-way point in the first macroblock, and has a horizontal width of 16. Thus, the strip identified as 9 comprises pixel columns 9–24. As shown, strip 17 begins at the start of a second macroblock from the left and comprises pixel columns 17–32. Thus, in the embodiment of FIG. 9B where the search frame has a horizontal width of 64 pixels, i.e., four macroblocks, a total of 49 possible strips exist within a search frame.

FIG. 10 illustrates respective candidate blocks selected within the first or left-most strip of the search frame. In, the numbers at the left of each search frame correspond to respective bands as discussed above with reference to FIG. 9A. The shaded portions in FIGS. 10a–10j correspond to selected candidate blocks which are the intersection between the respective band and the first or left most strip in the search frame. It is noted that FIG. 10 does not illustrate the manner or order in which candidate blocks are selected, but rather only illustrates the possible candidate blocks within a strip of the search frame. As discussed above with reference to FIG. 9, each strip of the search frame comprises 49 different candidate blocks.

Figure 10A:
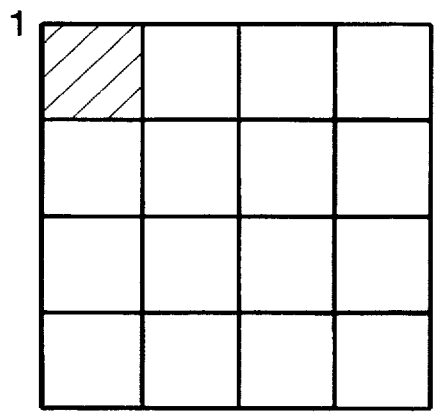
FIGS. 10a–10j illustrate candidate blocks in a strip of the reference frame.
Figure 10B:
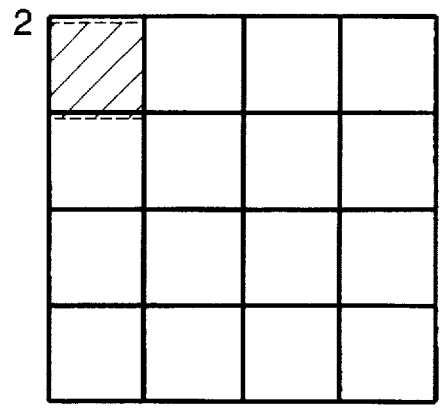
Figure 10C:
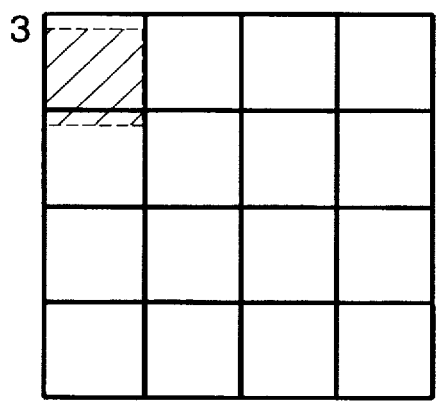
Figure 10D:
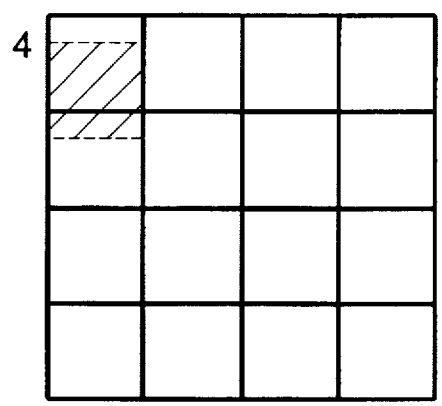
Figure 10E:
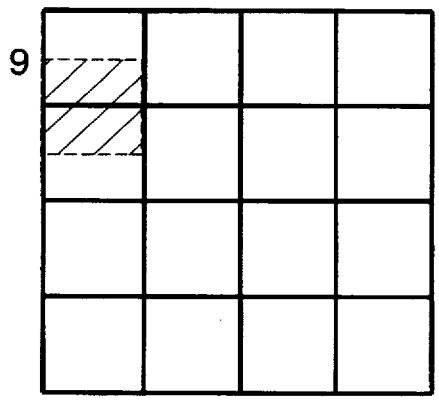
Figure 10F:
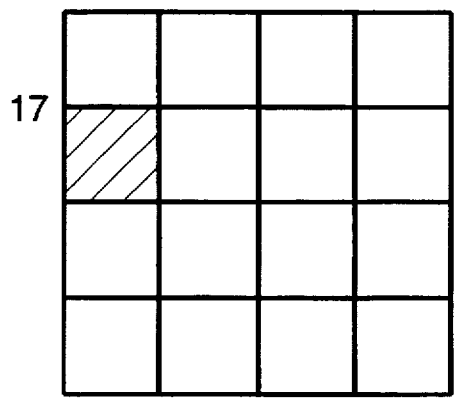
Figure 10G:
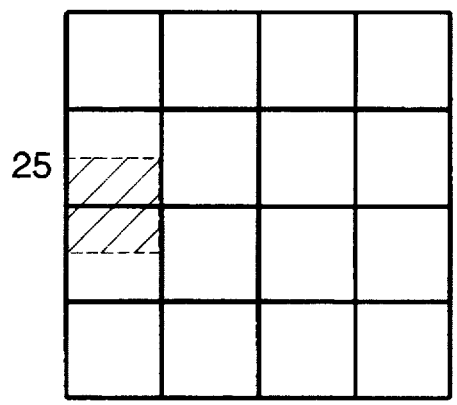
Figure 10H:
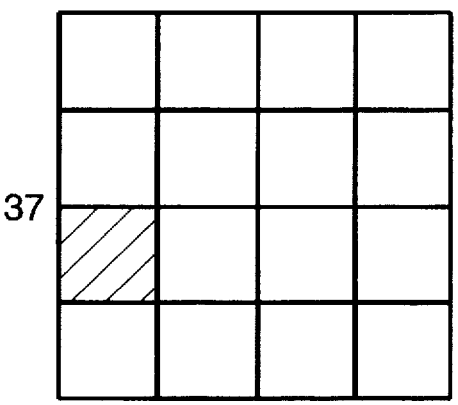
Figure 10I:
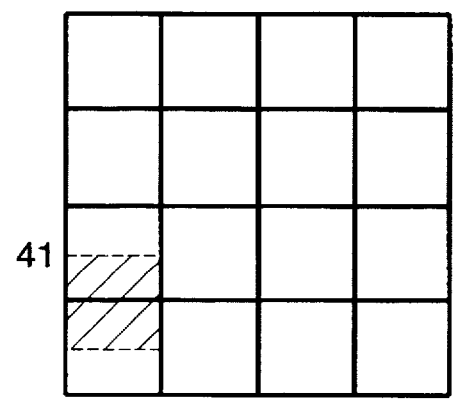
Figure 10J:
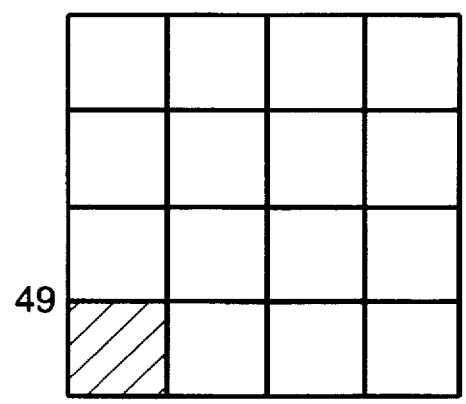

As shown in FIG. 10a, the first candidate block in a strip comprises the intersection of the top most band with the respective strip. FIGS. 10b, 10c and 10d illustrate the intersection of the second, third and fourth bands with the left most strip. Although not shown in FIG. 10, bands 5, 6, 7 and 8 also intersect with the respective strip to form respective candidate blocks. FIG. 10e illustrates the intersection of band 9 with the leftmost strip to form a candidate block. This candidate block thus begins 8 pixel rows downward from the first candidate block shown in FIG. 10a, which is on a sub-block boundary. Although not shown in FIG. 10, bands 10–16 also intersect with the respective strip to form respective candidate blocks. FIG. 10f illustrates the intersection of band 17 with the leftmost strip. As shown, the resulting candidate block is aligned on a macroblock boundary. FIGS. 10g and 10h illustrate intersection of band 25 with the leftmost strip and the intersection of band 33 with the leftmost strip, respectively. Similarly, FIGS. 10i and 10j illustrate the intersection of bands 41 and 49 with the respective strip to form candidate blocks. The candidate blocks illustrated in FIGS. 10g and 10i are aligned on sub-block boundaries, and the candidate blocks in FIGS. 10h and 10j are aligned on macroblock boundaries. As mentioned above, for a frame size of 64×64, there are a total of 49 possible candidate blocks in each strip, and only a portion of these are shown in FIG. 10.

In the preferred embodiment of the present invention, the candidate blocks are selected within a respective strip to maximize re-use of previously computed DCT transforms of these respective sub-blocks. Thus, as discussed further below, the selection of candidate blocks does not proceed in the order shown in FIG. 10, but rather proceeds in a different order to maximize reuse of previously computed DCT transformed values, as described below.

FIGS. 11–15: Selecting a Candidate Block (Step 304)

The preferred embodiment of the invention uses the concept of a "set of bands" which comprises a plurality of bands which are located on corresponding sub-block boundaries, i.e., are separated by 8 pixel rows. Thus, bands 1, 9, 17, 25, 33, 41 and 49, which are shown in FIG. 10a, 10e, 10f, 10g, 10h, 10i and 10j comprise one set of bands. Bands 2, 10, 18, 26, 34 and 42 comprise a second set of bands, and so on.

The operation of steps 304 in selecting a respective candidate block can be described in the following pseudo code:

For each set of bands
 For each strip
  Select the next macroblock in the intersection of the strip and set of bands As mentioned above, the DCT transform is performed on a respective macroblock by partitioning the macroblock into a plurality of sub-blocks and then performing the transform on each of those sub-blocks. Thus, in the preferred embodiment where the macroblock is a 16×16 macroblock, the macroblock is partitioned into four 8×8 blocks, and the DCT transform is applied to each of these four sub-blocks that is in the macroblock.

Thus, in the preferred embodiment, a set of bands is defined as the plurality of bands which effectively begin on sub-block boundaries. More particularly, a set of bands is defined as the plurality of bands which are spaced apart by the length of a sub-block. This allows the computation of the DCT transform for a candidate block to re-use the computed DCT transform values of the lower 2 sub-blocks of the previously computed candidate block. This is illustrated with respect to FIGS. 11–15.

FIG. 11 illustrates a selection of candidate blocks for a first set of bands in the left most or first strip in the search frame. As shown, in FIG. 11a the first candidate block is selected and then is DCT transformed as described above. In the next iteration of the flowchart of FIG. 6, the next candidate block selected is the intersection of the next band in the set of bands with the respective strip or first strip, as shown in FIG. 11b. As shown, the computation of the DCT transform on the candidate block in FIG. 11b can re-use the DCT transform values of the lower 2 sub-blocks of the first candidate block computed in FIG. 11a. In other words, as shown in FIG. 11a, the first 8 rows, rows 9–16, of this candidate block are the same rows as the upper rows of the second candidate block shown in FIG. 11b. These DCT transform values can thus be re-used and do not need to be re-computed for a computation of the DCT transform of the candidate block of FIG. 11b. Likewise, in FIGS. 11c, 11d, 11e, 11f, and 11g, the computation of the DCT transform of each of these respective candidate blocks uses prior computed DCT transform values of the lower two sub-blocks of the previously computed candidate block due to the overlap of the respective sub-blocks.

As shown in FIG. 12, after the candidate blocks corresponding to this intersection of this respective set of bands and the respective strip have been computed, the respective strip is incremented by one, and the new candidate blocks are formed from the respective set of bands and the new strip. Thus, as shown in FIG. 12a–12d, the same set of bands are used, and the intersection of this set of bands and the new strip are used to select macroblocks which form the respective candidate blocks. As shown in FIG. 12a–12g, each of these respective candidate blocks, except the first, have an overlap of the upper two sub-blocks in the respective candidate block with the lower two sub-blocks of the previously computed candidate block. The DCT transform of the lower 2 sub-blocks of the prior candidate block are thus re-used in the computation of the DCT transform of the new candidate block.

In addition, since the DCT transform is separable, advancing by one strip also provides additional computational savings. The DCT transform is generally performed by first transforming the columns followed by transforming the rows. Thus, when the respective strip is incremented by one, the prior transformed column values which were saved are re-used. This allows seven columns to be re-used for each of the two right sub-blocks. Thus computational savings are provided by re-use of both prior computed 2-D sub-blocks and prior computed 1-D columns.

Thus, candidate blocks are formed by the intersection of this respective set of bands and all of the respective strips in the search frame. Referring now to FIG. 13, when the intersection of this respective set of bands and strip number 9 is used to form candidate blocks, the candidate blocks have a left most boundary which aligns on sub-block boundaries of the candidate blocks computed in FIG. 11. In the preferred embodiment of the present invention, the DCT transform values of the right most sub-blocks in each of the candidate blocks of FIGS. 11a–11g are saved, and these DCT transform values are used in computation of the DCT transform of the candidate blocks in FIGS. 13a–13g.

Once the intersection of this respective set of bands and all of the respective strips have been used to form candidate blocks, then the selection advances to a new set of bands. As discussed above, the first set of bands comprises bands at values 1, 9, 17, 25, 33, 41 and 49. The next set of bands selected comprises bands at locations 2, 10, 18, 26, 34 and 42. The candidate blocks formed by the intersection of this next set of bands and the first strip is shown in FIG. 14. As discussed above with reference to FIG. 11, after computation of the DCT transform of the first candidate block in FIG. 14a, computation of the DCT transform in each of the remaining candidate blocks in FIGS. 14b–14f re-use the DCT transform values of the lower two sub blocks of the prior candidate block, thus simplifying the DCT computation. It is noted that there is one fewer candidate block in the intersection of this set of bands and a respective strip, as shown After the candidate blocks which intersect with this first strip have been selected and DCT transform values have been computed, then new candidate blocks are formed for the intersection of this set of bands and a new strip as shown in FIGS. 15a–15f. This process repeats for each of the strips and each set of bands.

Thus, selection of the candidate blocks in step 304 of FIG. 6 proceeds according to the pseudo code recited above. This manner of selection allows reuse of prior computed DCT transform values in computing the DCT transform of a newly selected candidate block. This simplifies the DCT transform computations and improves the performance of a motion estimation system which operates in the DCT domain.

Alternate Embodiment

In one embodiment of the present invention, the candidate block selection method also uses the concepts of a set of strips which is similar to a set of bands. A set of strips comprises a plurality of strips which have a distance of 8 columns corresponding to sub-block boundaries of a macroblock. In this embodiment, after computation of the first candidate blocks in FIG. 11, the method advances to the next strip in the set of strips, which are aligned on a sub-block boundary of a macroblock as shown in FIG. 13. Thus, in this embodiment, after performing the DCT transform computations of the macroblocks in FIG. 11, the method advances to next select the candidate blocks in FIGS. 13a–13g, wherein these candidate blocks comprise two left most sub-blocks which overlap with the two right most sub-blocks of the candidate blocks as shown in FIG. 11. In this embodiment, the DCT transform values of the right most sub-blocks of the candidate blocks in FIG. 11 are saved and are re-used in performing the DCT computation of the candidate blocks shown in FIGS. 13a–13g. Thus, in this embodiment, the selection method advances by sets of bands and sets of strips.

Figure 16:
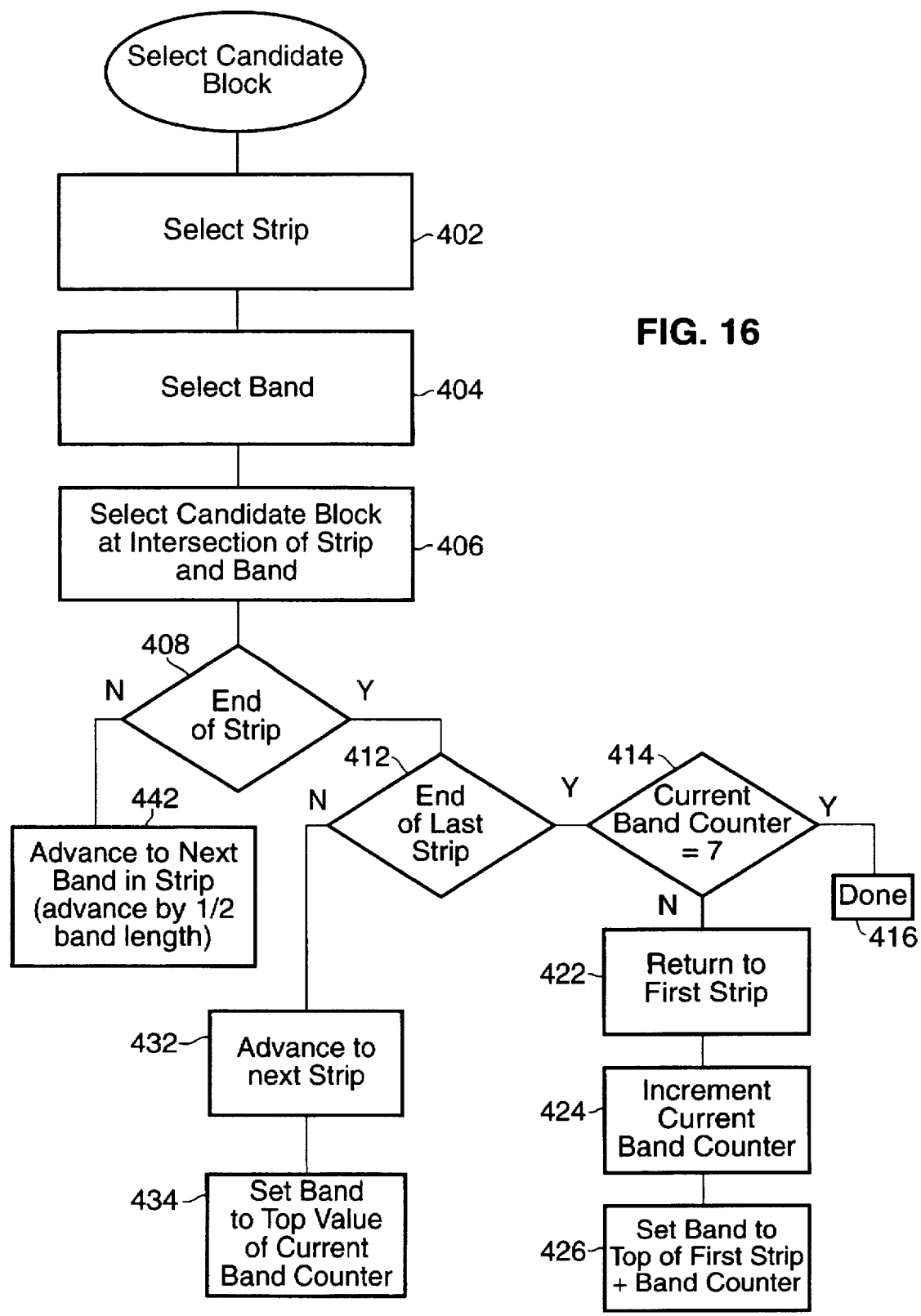
FIG. 16 is a flowchart diagram illustrating selection of candidate blocks.

FIG. 16—Flowchart Diagram of Selecting Candidate Blocks

Referring now to FIG. 16, a flowchart diagram is shown illustrating one embodiment of selecting candidate blocks in step 304 of FIG. 6 according to the preferred embodiment of the present invention. In this embodiment, a counter referred to as the current band counter is used to indicate which respective set of bands is currently being used to select candidate blocks. As discussed below, this counter is incremented to indicate a new set of bands when the candidate blocks from the intersection of a first set of bands and all of the possible set of strips have been selected.

Figure 11A:
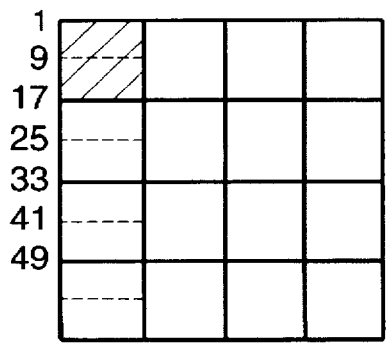
FIGS. 11–15 illustrate selection of candidate blocks according to the present invention.
Figure 11B:
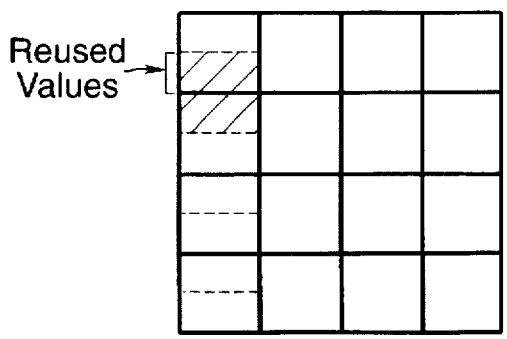
Figure 11C:
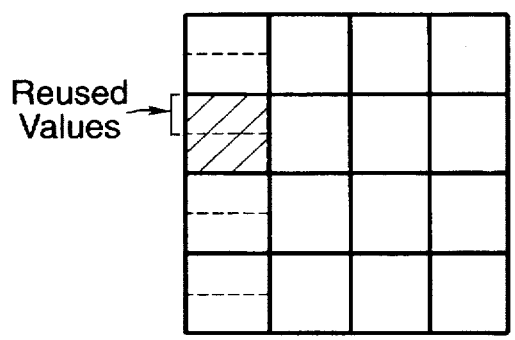
Figure 11D:
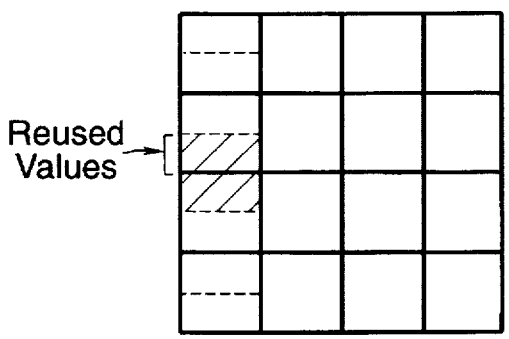
Figure 11E:
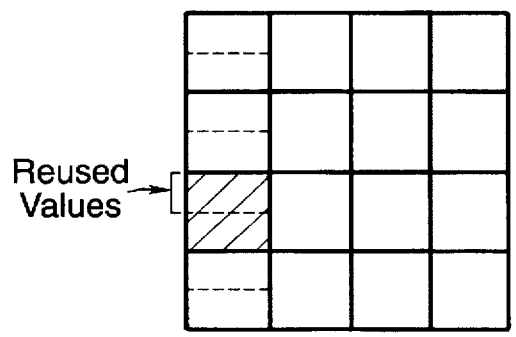
Figure 11F:
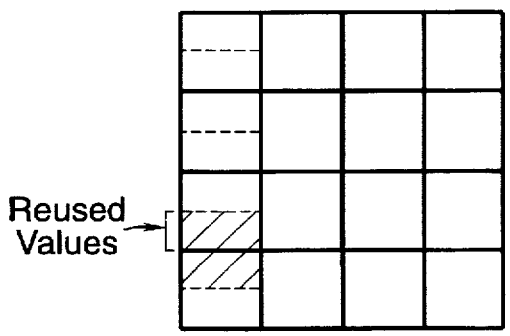
Figure 11G:
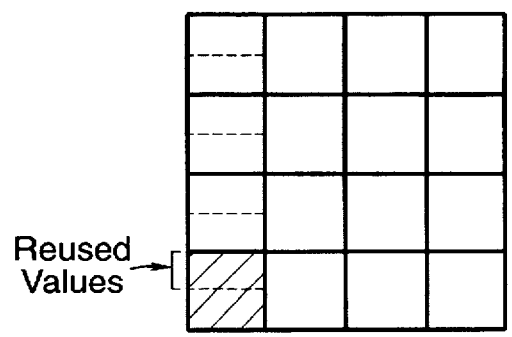

As shown, in step 402 the method selects a strip. At the beginning of this flowchart, the selected strip is set to a default value, which is the first or leftmost strip in the search frame, as shown in FIG. 11. In step 404 the method selects a band. As discussed above, at the beginning of the selection flowchart, the selected band is set to a default value, which is the first band in the first set of bands, i.e., which is band 1 as shown in FIG. 11A. In step 406 the method selects the candidate block at the intersection of the selected strip and the selected band.

After a candidate block has been selected at the intersection of the selected strip and selected band in step 406, the candidate block selection method then proceeds to advance or increment variables which identify a new strip and a new band. These steps are performed so that the next time step 304 is entered to select a new candidate block in the flowchart of FIG. 6, a new candidate block is selected based on the intersection of the selected strip and the selected band.

In step 408 the method determines if the candidate block selected, i.e., the selected band in step 404, is at the end of a strip. If not, then further candidate blocks are required to be selected within this strip. In this case, in step 442 the method advances to the next band in the strip, wherein the method advances by one-half of a band length or by the length of one sub-block. In other words, in step 442 the method advances to the next band within the respective set of bands. Thus, for example, as shown in FIG. 11, after the candidate block in FIG. 11a has been selected, since the method is not at the end of the respective strip, in step 442 the method sets the "next" band to be the band shown in FIG. 11b. Thus, step 442 essentially sets the band to be the next successive band in the respective set of bands as described above. Upon completion of step 442, operation then completes. Thus, on the next iteration through the flowchart of FIG. 6, when a new candidate block is selected in step 304, the candidate block selected occurs as described above with reference to FIGS. 11–15.

Figure 12A:
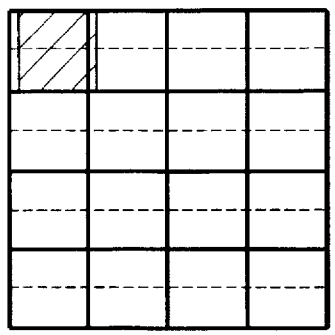
Figure 12B:
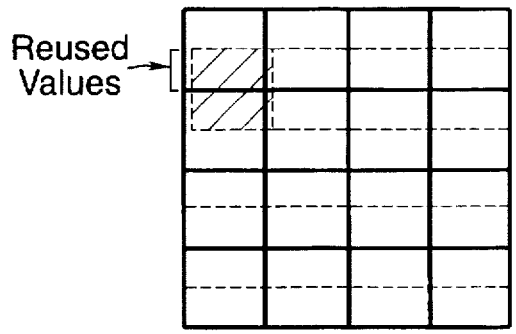
Figure 12C:
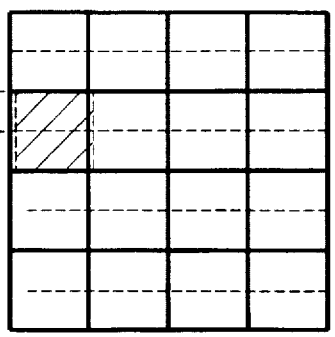
Figure 12D:
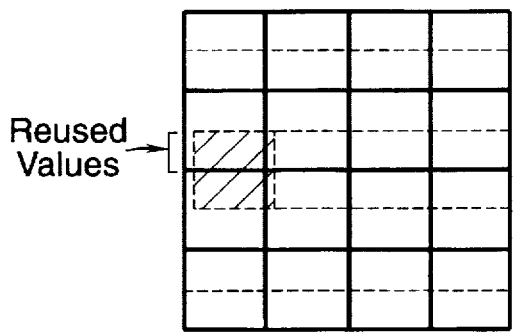
Figure 12E:
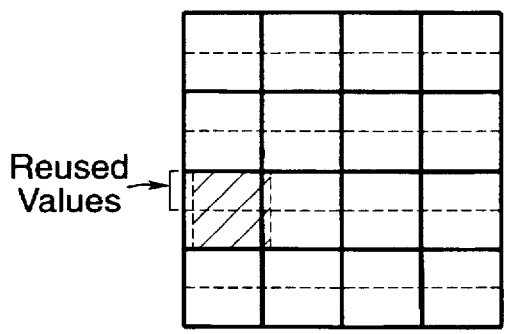
Figure 12F:
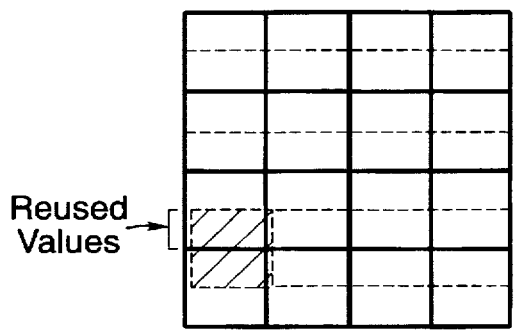
Figure 12G:
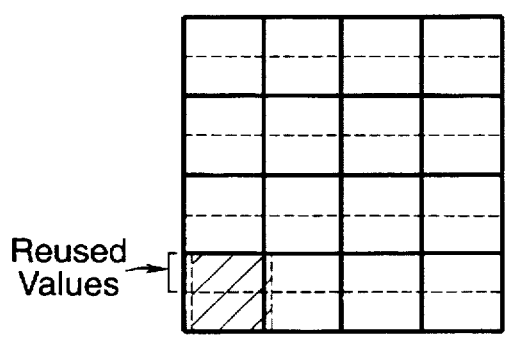
Figure 13A:
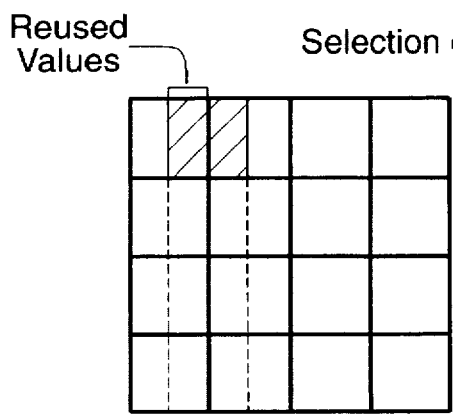
Figure 13B:
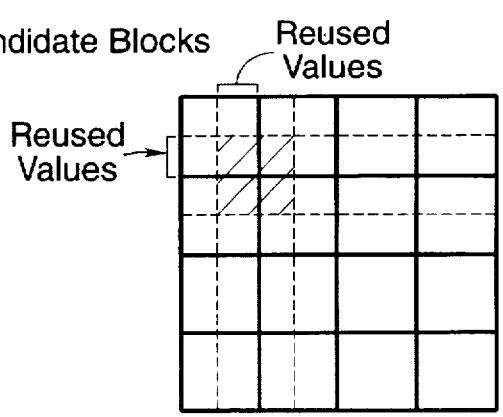
Figure 13C:
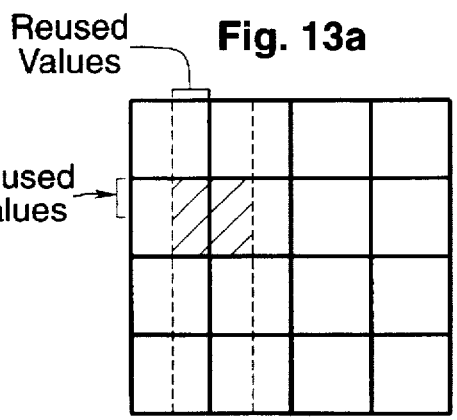
Figure 13D:
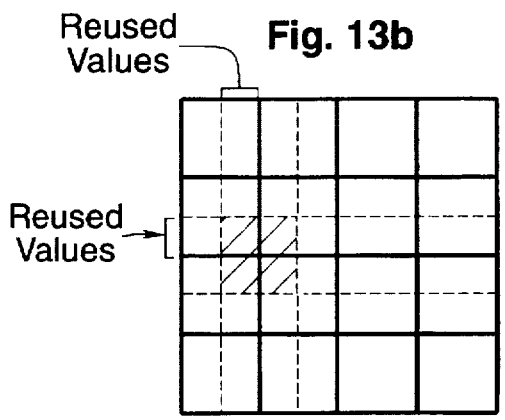
Figure 13E:
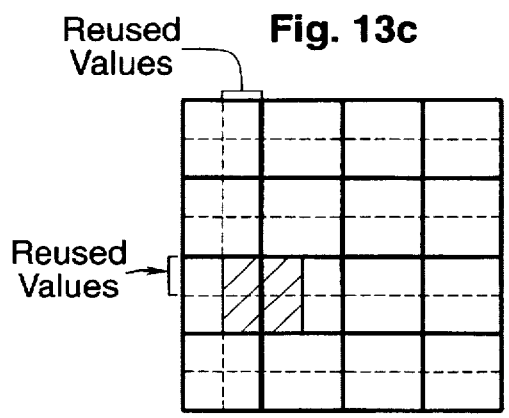
Figure 13F:
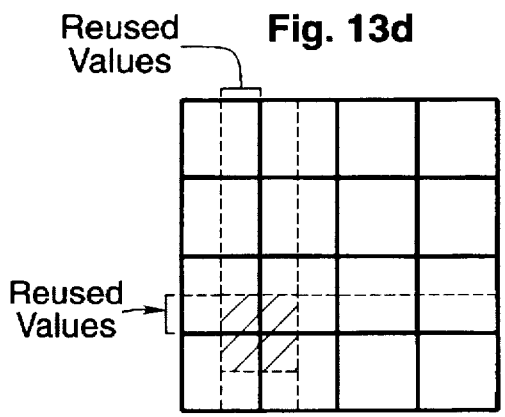
Figure 13G:
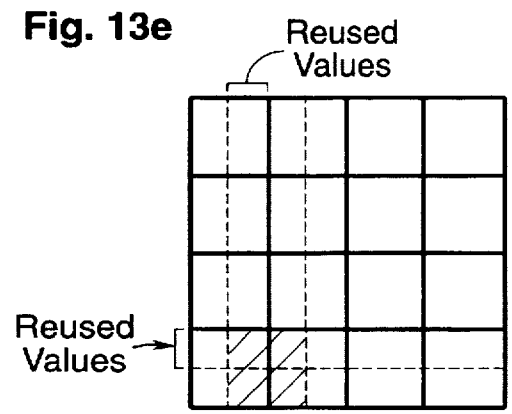

If the candidate block is at the end of the strip in step 408, then in step 412 the method determines if the candidate block is at the end of the very last strip. If not, then in step 432 the method advances to the next strip. In step 434 the method sets the band to the top most value plus a value referred to as the current band counter. As discussed above, the current band counter is used to identify which set of bands is being used in the candidate selection process. Initially, the band counter is set to a default value of zero. Thus, after the candidate blocks in a first strip have been selected, such as the candidate blocks in FIGS. 11a–11g, and a new strip is selected, for example, as shown in FIGS. 12a–12g, the band is set to the top value plus the current band counter. Since the current band counter is initially set to zero, the band selected will be as shown in FIG. 12a. However, after all of the strips for a respective set of bands have been used, the band counter will be incremented, as described below, and the band will be set to the top value plus a current band counter of, for example, 1, to select the candidate blocks shown in FIG. 14a.

If the respective candidate block is currently at the end of the last strip in step 412, then in step 414 the method determines if the current band counter value is equal to 7. In the preferred embodiment, where the respective blocks are 16×16 macroblocks and the sub-blocks are 8×8 blocks, the current band counter set equal to 7 indicates that all of the sets of bands have been used to determine candidate blocks. If all of the sets of bands have been used to determine candidate blocks, and since the method is at the end of the last strip, then all of the possible candidate blocks within a search frame have been selected and used. In this instance, operation completes in step 416 as shown. If the current band counter is not set equal to 7 in step 414, then operation proceeds to step 422.

Figure 14A:
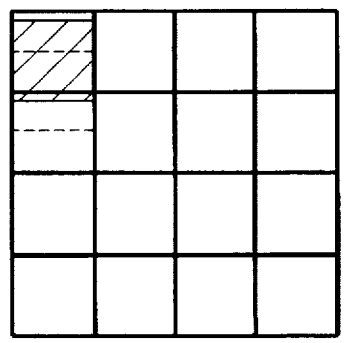
Figure 14B:
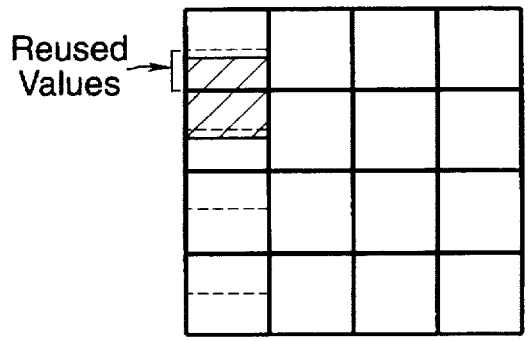
Figure 14C:
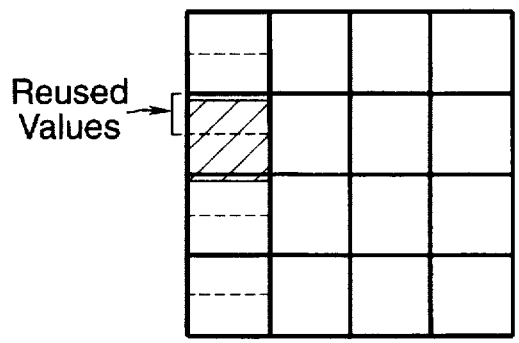
Figure 14D:
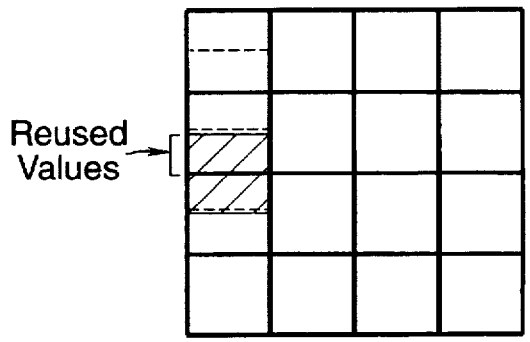
Figure 14E:
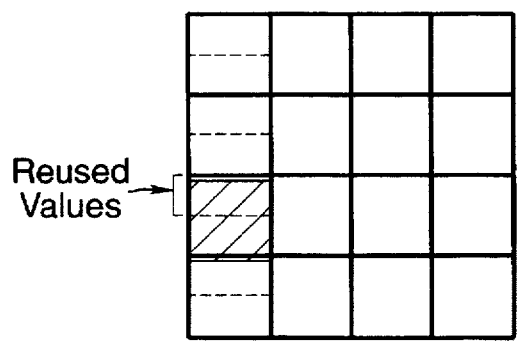
Figure 14F:
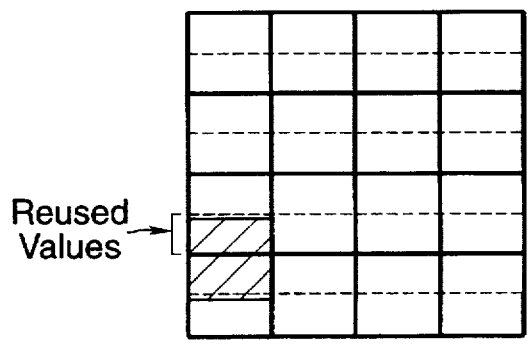
Figure 15A:
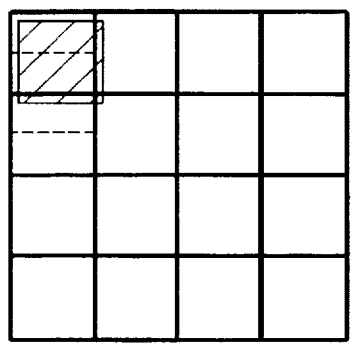
Figure 15B:
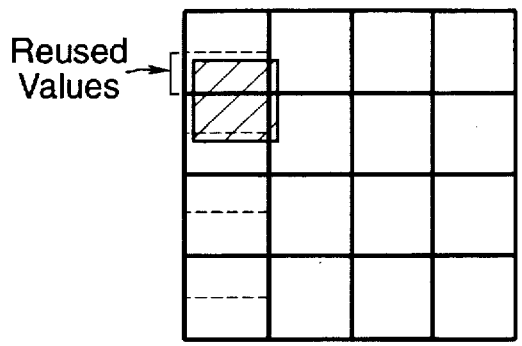
Figure 15C:
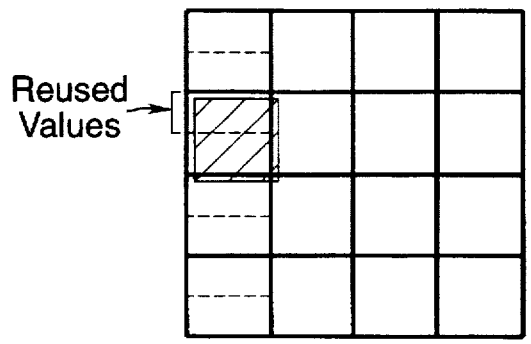
Figure 15D:
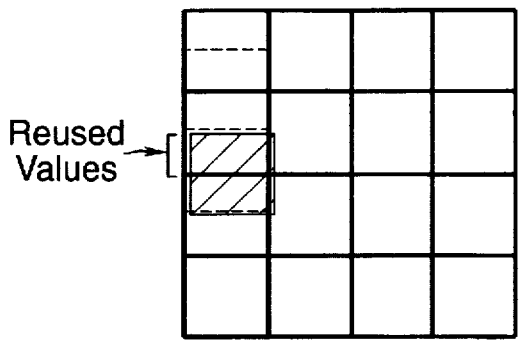
Figure 15E:
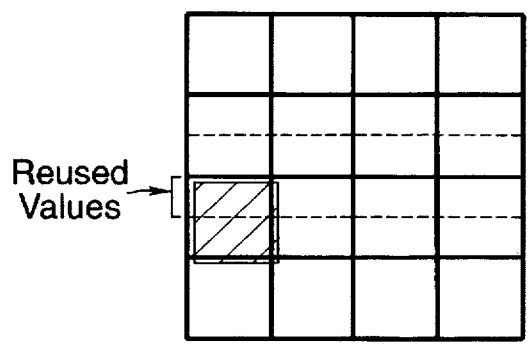
Figure 15F:
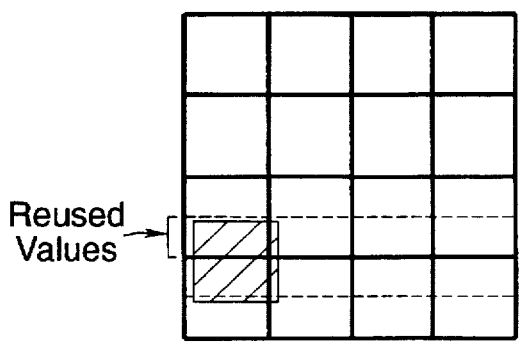

In step 422 the method has previously determined that the candidate block was at the end of the last strip. In this instance, in step 422 the method returns to the first strip. In step 424 the method increments the current band counter by 1, thus effectively selecting a new set of bands. In step 426 the method sets the band to the top value plus the respective current band counter. Thus, after all of the strips have been used for a respective set of bands as partially shown in FIGS. 11–13, the current band counter is incremented to select a new set of bands as shown in FIGS. 14a14f.

Therefore, the motion estimation system of the present invention performs motion estimation in the DCT domain and includes a novel method for selecting candidate blocks which reduces the required DCT transform computations for each of the respective candidate blocks. This method of selecting candidate blocks allows for re-use of prior DCT transform values computed for prior candidate blocks, thus increasing the efficiency and improving the performance of this system.

Figure 17:
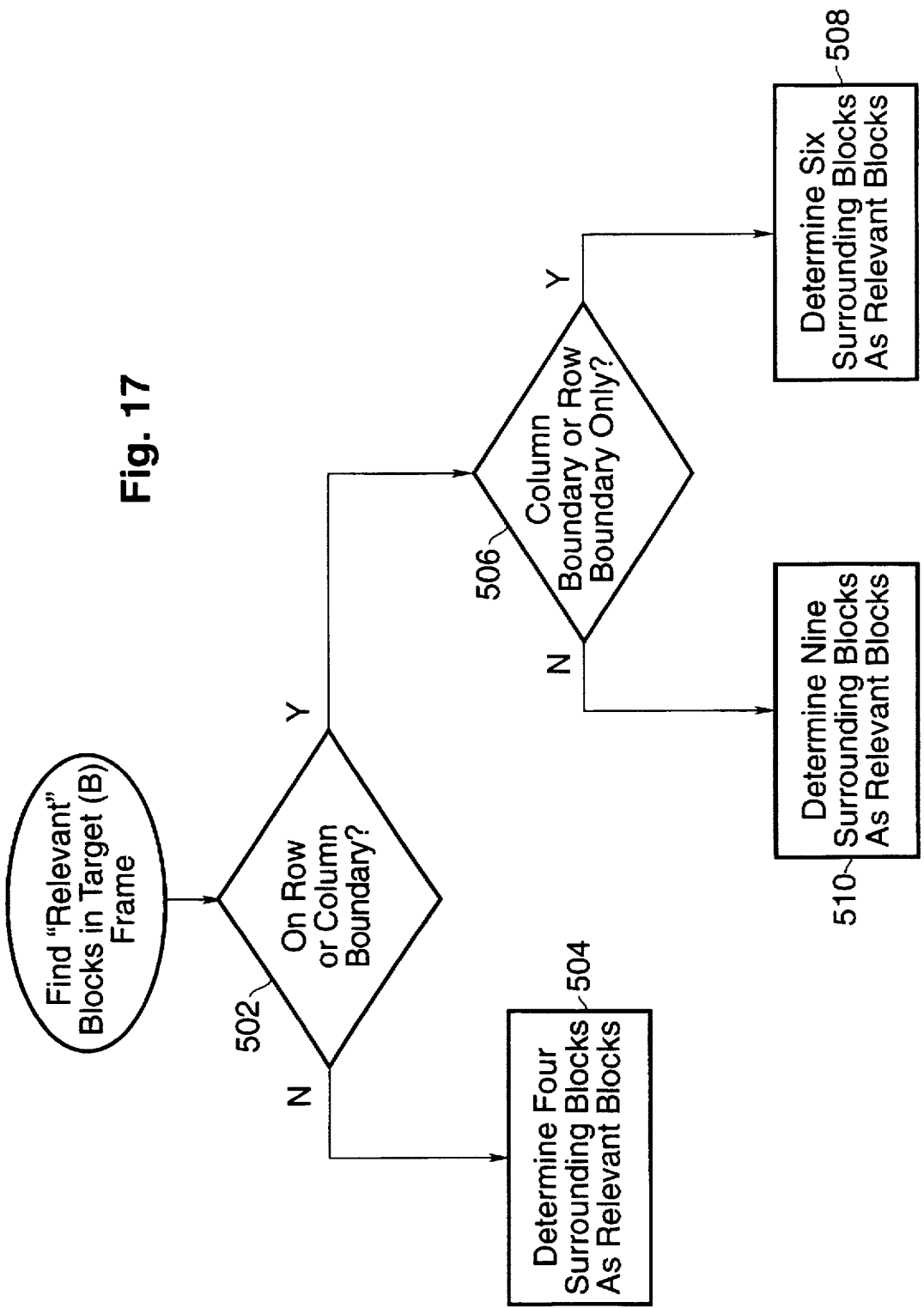
FIG. 17 is a flowchart diagram illustrating the determination of relevant blocks in a target frame.

FIG. 17—Finding Relevant Blocks

Referring now to FIG. 17, a flowchart diagram illustrating operation of the motion estimation system finding the relevant blocks in a target frame, such as a B frame, is shown. This flowchart illustrates the steps performed in step 308 of FIG. 6. As discussed above, this step determines the target blocks which have a search window which would include the selected candidate block. For a respective target block, a search window for the target block is preferably the window having a size which is plus or minus the width and/or length of the respective target block in either direction. In the preferred embodiment where the target block is a 16×16 macroblock, the search window is the window surrounding the target block having a border of 16 pixels to the left and right and 16 pixels up and down relative to the respective target block. It is noted that the method for finding relevant blocks may be implemented in a number of ways, as desired. Also, various search window sizes may be used, as desired.

Figure 18A:
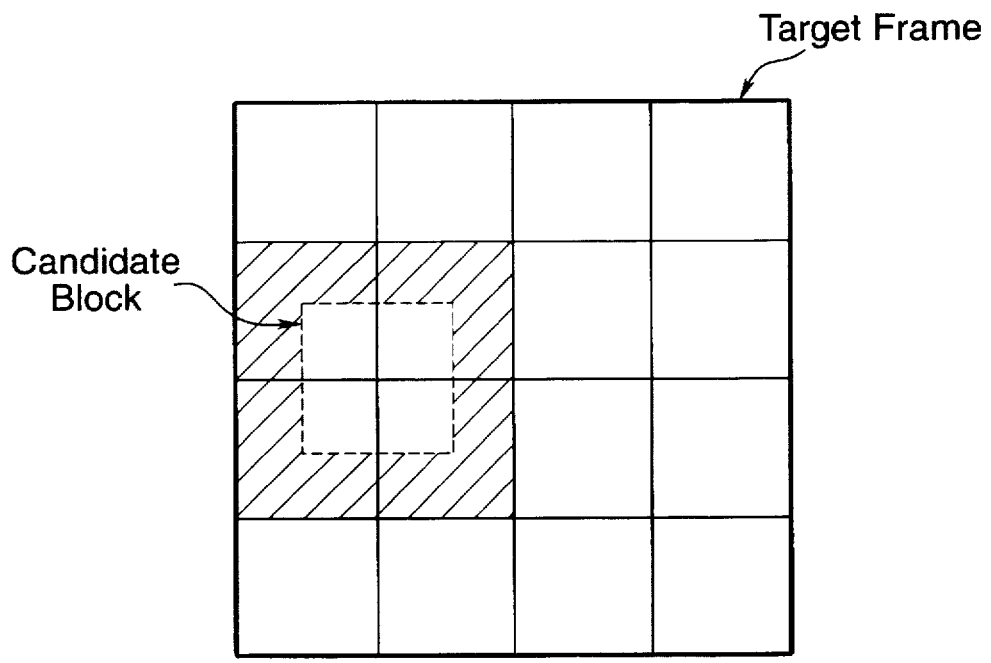
FIG. 18 illustrates various examples of candidate blocks and the associated relevant target blocks.

As shown, in step 502 the method determines if the selected candidate block is on a row or column boundary of any of the target blocks in the target frame. If not, then the method determines the four surrounding blocks as the relevant blocks. This is shown in FIG. 18a, where the candidate block is not aligned on either a row or column boundary of any of the target blocks. Thus, the method selects the four surrounding blocks as the relevant blocks.

As shown in FIG. 18a, each of the relevant target blocks which are shaded in FIG. 18a have a corresponding search window which includes the respective candidate block as shown. The other target blocks in the target frame have a search window which comprises only a portion or none of the respective candidate block, and thus these target blocks do not have the respective candidate block in their respective search windows.

Figure 18B:
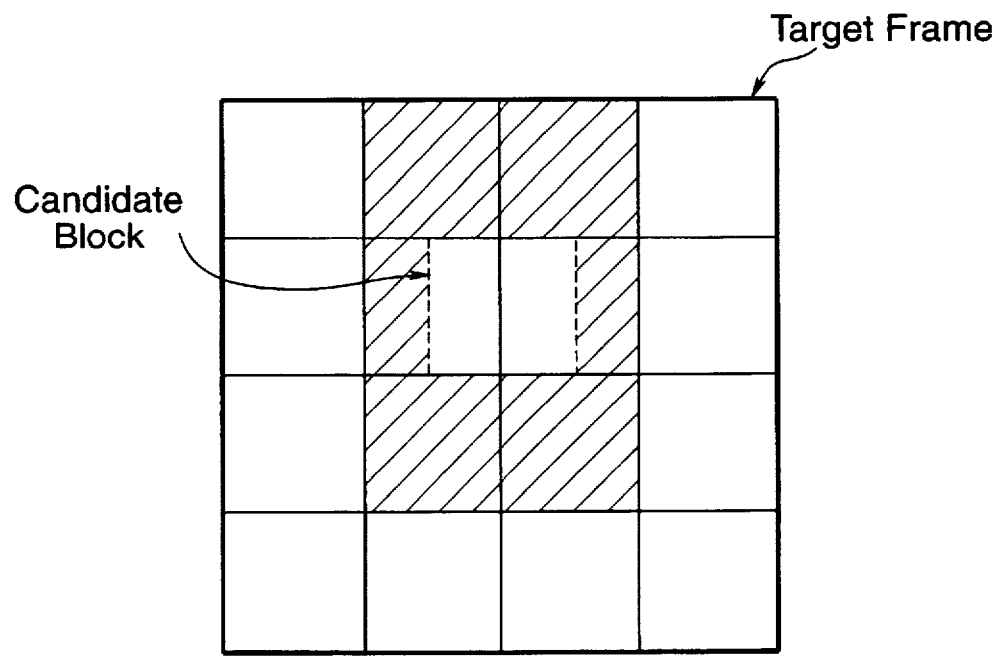
Figure 18C:
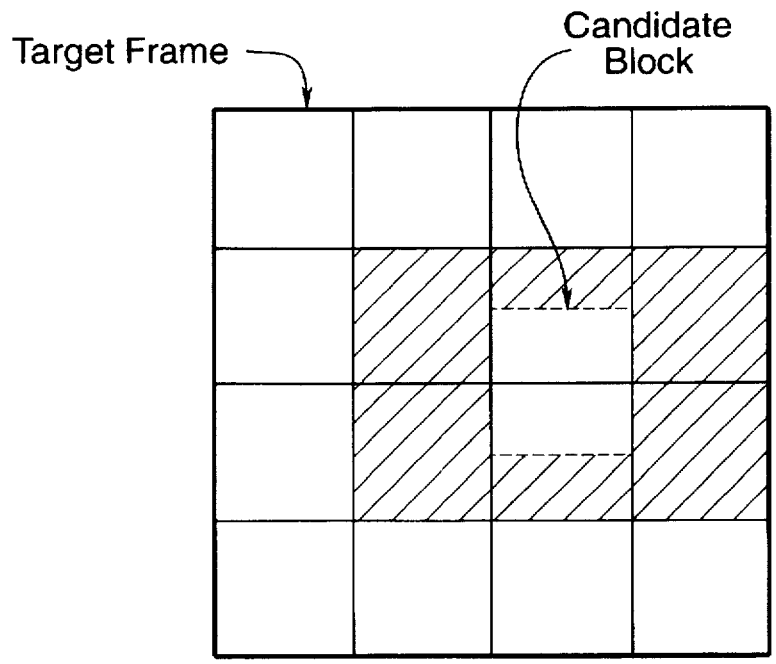

If the candidate block is determined to be on one or more of a row or column boundary in step 502, then in step 506 the method determines if the candidate block is on a row boundary only or a column boundary only. If the candidate block is only on a column boundary or only on a row boundary as determined in step 506, then in step 508 the method determines the six surrounding blocks as the relevant blocks. FIG. 18b illustrates a candidate block which is only on a row boundary, and FIG. 18c illustrates a candidate block which is only on a column boundary. As shown, the relevant target blocks are shaded in FIGS. 18b and 18c. As shown in FIGS. 18b and 18c, each of the relevant target blocks include the respective candidate block in its search window. The remaining target blocks which are not shaded in FIGS. 18b and 18c do not include this full candidate block in their search window.

Figure 18D:
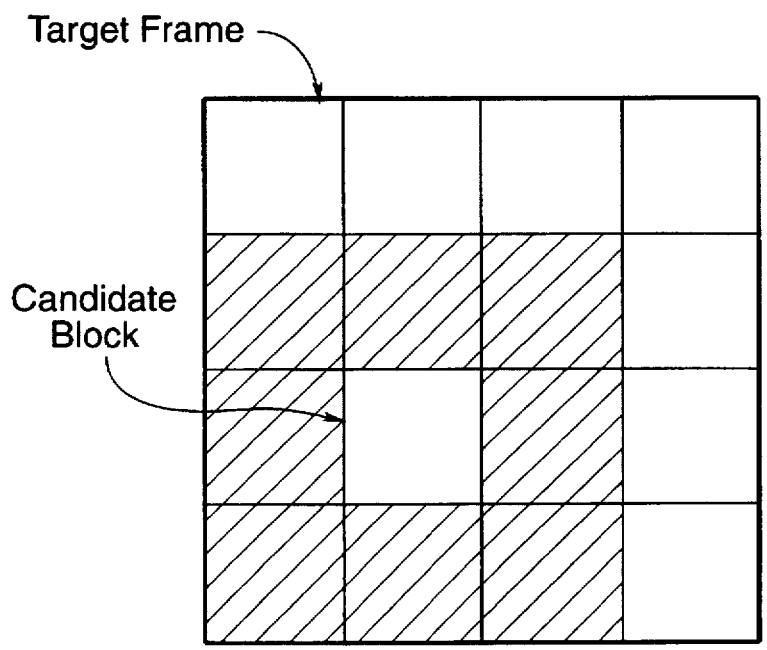

If the candidate block is not on a column boundary only or a row boundary only in step 506, then the candidate block must be on both a row and column boundary as shown in FIG. 18d. In this event, the method determines the nine surrounding target blocks of the candidate block as the relevant target blocks. The relevant target blocks are shown in FIG. 18d. It is noted that the target block directly below the candidate block in FIG. 18d is also a relevant target block.

Motion Estimation in the DCT Domain

As noted above, methods which find the best fit block typically operate in the spatial domain. The problem with this approach is that a block which is "close" in the spatial domain may not be "close" in the frequency domain, and it is the frequency domain "distance" that is encoded. In general, the quantization tables control the error that is introduced, and the goal is that the quantization errors are just below noticeable thresholds. Thus, when motion estimation is done in the spatial or pixel domain, the optimization is not done relative to the error that is introduced. The optimization is done relative to pixel values, whereas the error is introduced in quantizing DCT domain values. Thus, although the HVS is more sensitive to errors in the low frequencies than in the higher frequencies, there is no weighting of the errors with respect to their effect on the reconstructed image.

The present invention thus achieves both better picture quality and better compression by performing motion estimation using DCT transformed values. By operating in the DCT domain, the method decides the best fit block for the MPEG translational motion estimation, while staying in tune with the MPEG standard. The ideal goal of motion estimation is to find blocks which minimize the bits required to transmit the transformed and quantized difference. Given a maximum bit rate, the better the motion estimation is, the less bits are required and finer quantization can be used, hence better picture quality is achieved. If the encoded error requires a higher rate than the maximum allowed, coarser quantization must be used, increasing picture distortion. The motion estimation system of the present invention operates in the DCT domain and thus more accurately determines the blocks which minimize the bits required to transmit the transformed and quantized difference, thus finding the true "best fit."

An encoder using the motion estimation system and method of the present invention thus achieves maximum picture quality at a given bit rate. A family of quantization tables which have been designed to fit certain scene characteristics are assumed. Knowing the scene, a table is chosen. With respect to this table, the method selects reference blocks that achieve maximum compression. This is accomplished by selecting the reference block whose transformed-quantized difference from the target block is encoded into the shortest string. The preferred embodiment actually uses a different metric for selecting the best fit candidate block which does not require encoding each difference. This metric counts the number of coefficients that are quantized to zero, which is a close estimation to the metric which selects the shortest string. Thus the present invention maximizes perceived picture quality by optimizing the quantization tables relative to the HVS and carrying out motion estimation over the DCT images of the reference and target blocks, as opposed to the current mode of performing motion estimation over the pixel domain and transforming the difference after motion estimation has been completed.

In the preferred embodiment, the quantization tables are constructed with the frequency sensitivity of the HVS in mind, i.e., the loss due to quantization is just below perception thresholds for all frequencies, or some multiple of these thresholds. This way the information loss for each frequency can be stated in jnd (just noticeable differences) units. Thus, in determining the best fit when considering only picture quality, the block selected can be either the reference block that minimizes the maximum, or the average, number of units per block. By knowing the value of the quantized difference, the number of encoding bits required for each block can be determined as it is being considered. This can be taken into consideration when selecting the reference block.

With this scheme of estimating motion in the DCT domain, more blocks will be transformed than with estimating motion in the pixel domain. Thus, the following discussion analyzes the extra work involved and examines feasibility. As part of this analysis, the following discussion analyzes the tradeoff between computing effort and storage, and concludes with an optimal workpoint that balances both resources.

As with conventional MPEG, rate control strategies are considered in order to keep within the maximum rate. With the system of the present invention, these strategies can now be considered while selecting the best fit block, the results of which can only increase picture quality.

Analysis of Motion Estimation in the DCT Domain

The MPEG2 MP@ML constraints limit the number of columns in a luminance matrix to at most 720, the number of rows to at most 576 and the number of luminance samples to at most 345,600 (assuming 30 frames/sec). With these constraints, the maximum number of non-overlapping (8×8) luminance blocks is 5400. Each of the two chrominance samples is subsampled 2:1 in both the horizontal and the vertical directions. Thus the chrominance matrices are one quarter the size of the luminance matrix, and hence there are at most 2700 (8×8) non-overlapping chrominance blocks. In conventional MPEG2 encoding, each of these blocks is transformed, hence there can be up to 8100·16=129600 1 D DCT transforms per frame. A conventional encoder has one DCT unit operating at 27 MHz. To provide a tangible measure of the cost involved with the method of the present invention, the number of DCT units will be given as needed for its implementation. It is assumed that one DCT unit can compute up to 129600 transforms per frame. The number of DCT units required for a certain implementation is calculated as the number of required transforms per frame divided by 129600.

A general assumption is that luminance motion is the same as chrominance motion, hence the MPEG syntax allows for only one motion vector (in each direction) per macroblock. Thus, only luminance motion is estimated. As a side note, while it may be advantageous in certain applications to know what the actual motion is, this is not the case here. The only point of interest is to find a reference block whose difference from the target block results in minimum encoding.

For this analysis, it is assumed that between every consecutive I and P frames there are two B frames. Since the next reference (I or P) frame will be used in coding the B frames, the next I frame is coded before a prior B frame. If this next frame is a P frame, then it needs prediction and thus requires the extra transforms. These extra transforms will also be required when encoding the B frames. If all three frames are encoded concurrently, the extra transforms can be amortized over three frames. To complete the coding of the B frames, they need to be backward predicted, i.e. the overlapping (8×8) blocks of the P frame must be transformed.

The basis for comparison will be the number of 1D DCT transforms needed to encode a sequence IBB or PBB. In conventional prior art methods these three frames require the 2D transformation of the non-overlapping (8×8) blocks of the I/P frame, the reconstruction of the I/P frame and two 2D transformations of each of the non-overlapping (8×8) blocks in the two B frames. Each frame requires at most 129600 1 D transforms, hence the cost is 6·129600. The method of the present invention requires transforming each of the (8×8) blocks in all three frames, reconstructing the I/P frame and the extra transformations for the past and future reference blocks. Denoting this extra computation by X, the number of DCT units required is given by $$\frac{2X + 4 \cdot 129600}{6 \cdot 129600}$$

Note that if the future reference frame is a P frame, then it is actually encoded with the 2 B frames, but the operations (transforming the (8×8) blocks) are counted with the next PBB set.

In conventional MPEG the two B frames need to be stored while the P frame is encoded. This scheme also requires this. But, whereas conventional MPEG encodes one frame at a time, we encode three frames at a time. This will probably result in the need for 2 additional encoding buffers.

Note that if there are more than two B frames between I/P frames, the reference transforms are amortized over more frames, hence fewer DCT units are needed. However, more storage is needed.

In estimating the work required to find the best fit block, assume an exhaustive search is conducted on a ±16 pixel neighborhood of the target block. If MPEG looks at the absolute difference and our scheme looks for the number of coefficients quantized to 0, then the work load is the same.

Computational Requirements for Motion Estimation in the DCT Domain

In this subsection an analysis is done on the work required for carrying out the extra DCT computations as well as the extra storage required for performing motion estimation in the DCT domain according to the present invention. In the conventional or prior art MPEG scheme, the target blocks are considered in raster scan order and each block is compared to all its reference blocks or candidate blocks in order to find the best fit. However, as discussed above, the method of the present invention takes the opposite approach. In the method of the present invention, reference blocks or candidate blocks are considered one at a time, not in raster scan order. The target blocks in whose neighborhoods the reference block resides are compared to the reference block or candidate block. Each target block keeps a pointer to, and the fit value of, the best reference block encountered so far.

In this analysis, r and c will represent the number of rows and columns, respectively, in a frame. Also, a band is defined as 16 consecutive rows. The bands are numbered 1 through (r−15) from top to bottom.

Figure 19:
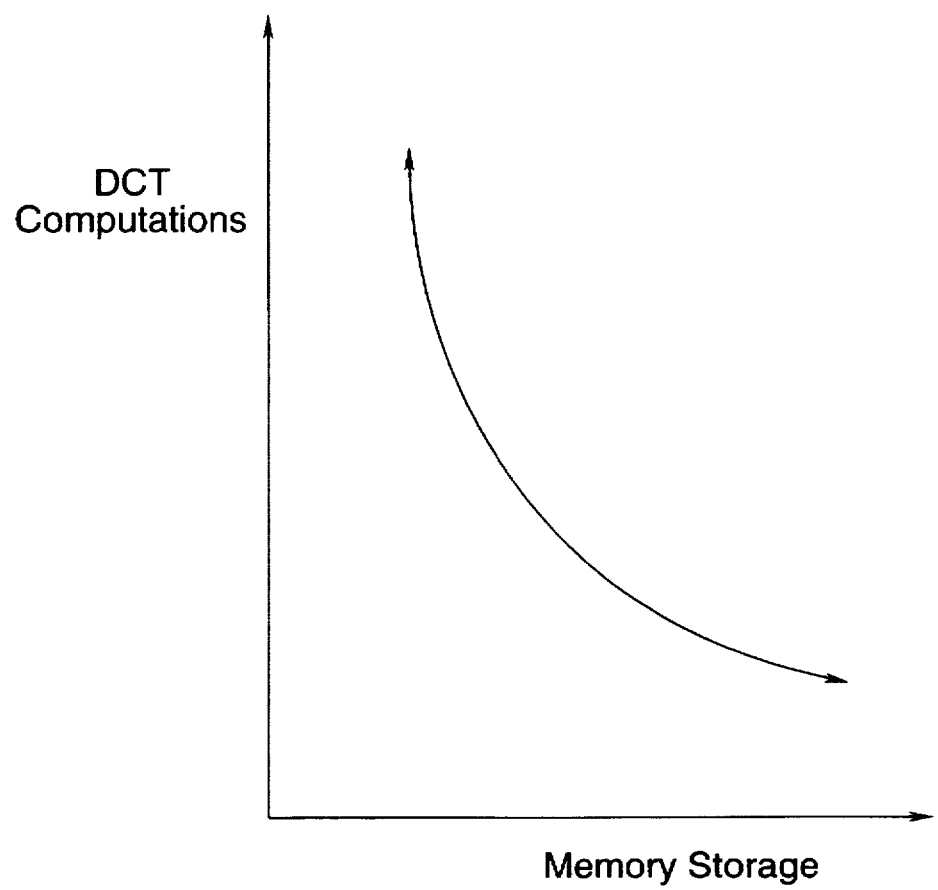
FIG. 19 is a graph which illustrates the number of DCT computations plotted versus the corresponding memory storage requirements.

FIG. 19 is a graph which illustrates the number of DCT computations plotted versus the corresponding memory storage requirements. As shown, the first point on the curve requires minimal storage but the most DCT computations. First, the four (8×8) transforms of the overlapping (16×16) blocks in the first band are computed, then the four (8×8) transforms of the overlapping (16×16) blocks in the second band, and so forth, until the bottom band. The only extra storage required, in addition to the current four (8×8) transformed blocks, is 30 transformed (8×1) columns, which are the top and lower halves of the 15 rightmost columns of the current (16×16) block, before being transformed in the second dimension. The extra storage required is 30·8=240 DCT coefficients.

The work required for each band is 2c transforms for the 8×1 columns in the band and 32 row transformns for each of the (c−15) overlapping (16×16) blocks. There are (r−15) bands, hence the total work is $$(r-15) (2c+32(c-15))=34rc-480r-510c+7200 \quad (1)$$

The maximum value of Eq. (1), assuming r and c are multiples of 16, is 11,160,000 for r=480 and c=720. Thus, the number of DCT units needed is $$\frac{2 \cdot 11,160,000 + 4 \cdot 129600}{6 \cdot 129600} = 29.37$$

This is very inefficient from a computation point of view since bands that are 8 rows apart share two of four (8×8) blocks and (16×16) blocks in the same band that are 8 columns apart also share two of four (8×8) blocks.

As a first step in reducing computation at the expense of added storage, the method of the present invention re-uses the right most sub-blocks of a prior computed candidate block in computing the DCT transform of a new candidate block, as discussed above with reference to FIG. 13. The two right (8×8) transformed blocks are stored in 8 consecutive overlapping (16×16) blocks in a band. The two right (8×8) blocks of the jth (16×16) block in a band are the two left blocks of the (j+8)th (16×16) block, hence these (8×8)s do not have to be recomputed.

In each band the work is as follows:

First (16+7) columns: these columns contain the first 8 overlapping (16×16) blocks. Each of these blocks has four (8×8) blocks that need to be transformed. The work involved is 2·23 column transforms plus 8·4·8 row transforms.

Remaining (r−23) columns: these columns contain the remaining (c−8−15) overlapping (16×16) blocks. For each of these blocks the two left (8×8) blocks have already been transformed. The work required for each of the remaining (c−23) overlapping macroblocks is 2 column transforms plus 16 row transforms.

There are (r−15) bands for a total work load of $$(r-15)(2\cdot23+256+2(c-23))+16(c-23))=18rc-112r-270c+1680 \quad (2)$$

The storage requirements are 2·7 transformed columns and 2·8 transformed (8×8) blocks for a total of 14×8+16·64= 1136 stored DCT coefficients.

Eq. (2) gets it maximum of 5,974,320 for r=480 and c=720. The number of DCT units needed is $$\frac{2 \cdot 5{,}974{,}320 + 4 \cdot 129600}{6 \cdot 129600} = 16.03$$

To further reduce computation at the expense of added storage, the method re-uses the lower two sub-blocks of a prior computed candidate block in computing the DCT transform of a new candidate block. This was discussed above with reference to FIGS. 11–15. The lower (8×8) blocks of the jth band are the top blocks of the (j+8)th band. In processing the bands out of order, the method first goes over the bands whose numbers are congruent to 1 mod 8, then goes over the bands whose numbers are congruent to 2 mod 8 and so forth. For each set of bands, the transforms of the lower (8×8) blocks are stored. With this scheme the (c−23) leftmost (16×16) blocks have their lower right (8×8) computed and stored. Also, when transforming the first band of each set there is enough storage to store the top right (8×8) as well as the two lower (8×8)s. Thus, for the rightmost (c−23) (16×16) blocks in these bands only 2 (8×8)s need to be computed. Thus, the actual work is as follows:

First band in each set:
First 23 columns: 2·23 column transforms plus 8·4·8 row transforms.
Remaining (c−23) columns: 2·(c−23) column transforms plus 2·8(c−23) row transforms.

Remaining (r−23) bands:
First 23 columns: 23 column transforms plus 8·2·8 row transforms.
Remaining (c−23) columns: (c−23) column transforms plus (c−23)·8 row transforms.

The total comes out to $$8(46+256+(c-23)(2+16))+(r-23)(23+128+(c-23)9)=9rc-56r-63c+392 \quad (3)$$

The maximum value of Eq. (3) is 3,038,552 for r=480 and c=720. The number of DCT units required is $$\frac{2 \cdot 3{,}038{,}552 + 4 \cdot 129600}{6 \cdot 129600} = 8.48$$

If the circuit frequency is increased to 54 MHz then five DCT units will suffice.

As discussed above, the method of the present invention defines 16 consecutive columns to be a strip. Strips are numbered 1 through (c−15) from left to right. When encoding a set of bands the progress is from top to bottom, i.e., encoding starts with the top band of the set and ends with the bottom band. The order of encoding can also go in the orthogonal direction, i.e., first encode the intersection of the set with the first strip, then the intersection with the second strip, etc. The number of transforms required by the two schemes will be the same, but since the number of rows is less than the number of columns, encoding a set of bands from top to bottom saves on storage.

The work required is as follows:

First 8 strips and first band in each set: this covers the first 8 overlapping (16×16) blocks. The work required is 2·23 column transforms plus 8·4·8 row transforms.

Remaining (c−15−8) strips in the first band of each set: in each new (16×16) block the two left (8×8) were computed and stored, as were the 7 left columns in the right (8×8)s. The work is then 2 column transforms plus 2×8 row transforms.

First 8 strips in remaining bands: the two top (8×8)s were computed and stored. Only the lower (8×8)s need to be transformed. The work required is 23 column transforms plus 8·2·8 row transforms.

Remaining (c−15−8) strips in the remaining bands: the top two and lower left (8×8)s were computed and stored, as were the 7 left columns of the lower right (8×8). The work is thus one column transform and eight row transforms.

The total work is $$8(46+256+18c-46-16 \cdot cdot\ 23)+(r-15-8)(23+128+9c-9\cdot23)\ 9rc-56r-63c+392$$

which is equal to Eq. (3).

As in the previous scheme, data only needs to be stored for one set at a time. For the first band of a set, the two right (8×8)s of 8 consecutive blocks need to be stored, as well as the rightmost 14 transformed columns in these (8×8)s. For the remaining bands, 7 columns and 8 blocks are needed. There are (r−15)=(r−16+1) bands and r is divisible by 16. Therefore, the number of bands is r−16/8+1 in the first set and r−16/8 in the remaining sets. The first set has more bands, hence its storage requirements are calculated.

$$2 \cdot 64 \cdot 8 + 14 \cdot 8 + \frac{r-16}{8}(7 \cdot 8 + 8 \cdot 64) = \begin{cases} 40{,}896 \text{ for } r = 576 \\ 34{,}080 \text{ for } r = 480 \end{cases}$$

The last scheme is deemed the most efficient and is the preferred embodiment. Notice that the neighborhood in which the best fit block is sought has no effect on either the DCT computations or the required extra storage. The affect of neighborhood selection, as in the conventional scheme, is only in the work required to find the best fit.

In comparing the motion estimation system of the present invention to pixel domain methods, the following additional resources are required. First: pixel domain schemes require one encoding buffer, whereas the present invention requires three encoding buffers. Also, pixel domain schemes require one DCT unit, whereas the present invention requires five DCT units. The present invention also requires additional memory for 34,080 DCT coefficients (assuming frame size of (480×720)). When evaluating reference blocks, an exhaustive search over a ±16 pixel neighborhood of the target block in pixel domain methods is equivalent to the preferred method of counting coefficients quantized to zero in the same neighborhood.

Conclusion

Therefore, the present invention comprises a system and method for generating motion estimation vectors from an uncompressed digital video stream. The present invention performs motion estimation in the frequency or DCT domain with improved performance and reduced computational requirements. Although the system and method of the present invention has been described in connection with the described embodiments, it is not intended to be limited to the specific form set forth herein, but on the contrary, it is intended to cover such alternatives, modifications, and equivalents, as can be reasonably included within the spirit and scope of the invention as defined by the appended claims.

I claim:

1. A method for performing motion estimation between a target frame and a search frame, wherein the target frame includes a plurality of target blocks, the method comprising:

performing a frequency domain transform on the plurality of target blocks in the target frame;

selecting a candidate block from the search frame;

performing a frequency domain transform on the selected candidate block from the search frame;

determining one or more target blocks in the target frame in response to said selected candidate block;

computing a distance between the transformed values of the selected candidate block and the transformed values of each of said one or more determined target blocks, wherein said computing produces a distance for each of said one or more determined target blocks;

determining if said computed distance is a better metric than a currently stored computed distance for each of said one or more determined target blocks;

storing a location of said selected candidate block for a respective target block if said computed distance for said respective target block is a better metric than the current best computed distance for said respective target block;

wherein said selecting a candidate block from the search frame, performing a frequency domain transform on the selected candidate block from the search frame, determining one or more target blocks in the target frame, computing a distance, determining if said computed distance is a better metric, and storing a location of said selected candidate block, are performed for a plurality of candidate blocks in said search frame, wherein said performing for said plurality of candidate blocks in said search frame produces motion vectors for a plurality of said target blocks in said target frame.

2. The method of claim 1, wherein said determining one or more target blocks in the target frame comprises determining one or more target blocks in the target frame which have a corresponding search window which includes the selected candidate block.

3. The method of claim 1, wherein said selected candidate block is not located on a row or column boundary of any of said target blocks, wherein said determining one or more target blocks in the target frame comprises determining a first number of neighboring target blocks in the target frame, wherein each of said determined first number of neighboring target blocks has a corresponding search window which includes the selected candidate block.

4. The method of claim 3, wherein said selected candidate block is located on both a row and column boundary of one of said target blocks, wherein said determining one or more target blocks in the target frame comprises determining a second number of neighboring target blocks in the target frame, wherein each of said determined second number of neighboring target blocks has a corresponding search window which includes the selected candidate block; wherein said second number is greater than said first number.

5. The method of claim 4, wherein said selected candidate block is located on one of either a row or column boundary of at least one of said target blocks, wherein said determining one or more target blocks in the target frame comprises determining a third number of neighboring target blocks in the target frame, wherein each of said determined third number of neighboring target blocks has a corresponding search window which includes the selected candidate block, wherein said search window is square, wherein said third number is greater than said first number and less than said second number.

6. The method of claim 1, wherein said computing a distance between the transformed values of the selected candidate block and the transformed values of each of said one or more determined target blocks comprises:

subtracting the transformed values of the selected candidate block from the transformed values of each of said one or more determined target blocks, wherein said subtracting produces a matrix for each of said one or more determined target blocks; and determining the number of values in said matrices which will be quantized to zero for each of said one or more determined target blocks.

7. The method of claim 1, wherein said computing a distance between the transformed values of the selected candidate block and the transformed values of each of said one or more determined target blocks comprises:

subtracting the transformed values of the selected candidate block from the transformed values of each of said one or more determined target blocks, wherein said subtracting produces a matrix for each of said one or more determined target blocks;

quantizing said matrices for each of said one or more determined target blocks;

encoding each of said quantized matrices for each of said one or more determined target blocks into a plurality of bits; and determining which of said encoded matrices has a least number of bits.

8. The method of claim 1, further comprising:

storing said computed distance for said respective target block if said computed distance is a better metric than the current best computed distance for said respective target block.

9. The method of claim 1, wherein said performing a frequency domain transform comprises performing a Discrete Cosine Transform (DCT).

10. The method of claim 1, wherein said selecting a candidate block from the search frame, performing a frequency domain transform on the selected candidate block from the search frame, determining one or more target blocks in the target frame, computing a distance, determining if said computed distance is a better metric, and storing a location of said selected candidate block, are performed for all candidate blocks in said search frame, wherein said performing for all candidate blocks in said search frame produces motion vectors for each of said target blocks in said target frame.

11. The method of claim 1, wherein said target frame and said search frame are comprised in an MPEG stream.

12. The method of claim 1, further comprising:
storing at least a portion of said transformed values of the selected candidate block after said performing a frequency domain transform on the selected candidate block from the search frame;
wherein said selecting a candidate block from the search frame includes selecting a candidate block which re-uses said at least a portion of said transformed values of a prior selected candidate block.

13. The method of claim 12, wherein said performing a frequency domain transform on the selected candidate block from the search frame comprises:
partitioning the selected candidate block into a plurality of sub-blocks; and
performing a frequency domain transform on each of said plurality of sub-blocks;
wherein said storing at least a portion of said transformed values of the selected candidate block comprises storing transformed values of one or more of said sub-blocks;
wherein said selecting a candidate block from the search frame includes selecting a candidate block which re-uses said stored transformed values of said one or more of said sub-blocks.

14. The method of claim 13, wherein said search frame comprises a plurality of horizontal bands, wherein each of said horizontal bands has a vertical length equal to a vertical length of said candidate blocks, wherein each of said horizontal bands includes a first portion and a second portion;
wherein said search frame further comprises a plurality of vertical strips, wherein each of said vertical strips has a horizontal width equal to a horizontal width of said candidate blocks;
wherein said selecting a candidate block from the search frame comprises:
for each vertical strip, selecting a horizontal band in the vertical strip which re-uses said second portion of a prior horizontal band.

15. The method of claim 14, wherein said search frame comprises a plurality of horizontal bands, wherein each of said horizontal bands has a vertical length equal to a length of said candidate blocks, wherein each of said horizontal bands includes an upper portion comprising one or more upper sub-blocks and a lower portion comprising one or more lower sub-blocks;
wherein said search frame further comprises a plurality of vertical strips, wherein each of said vertical strips has a horizontal width equal to a horizontal width of said candidate blocks;
wherein, for each vertical strip, said selecting a candidate block from the search frame comprises:
selecting a horizontal band in the vertical strip which re-uses a lower portion comprising a lower number of sub-blocks of a prior horizontal band, wherein said selecting is performed a plurality of times for a plurality of horizontal bands in the vertical strip;
wherein said selecting horizontal bands in the vertical strip which re-use lower portions of prior horizontal bands is performed a plurality of times for each of said vertical strips to select all of the candidate blocks in said search frame.

16. The method of claim 14, further comprising:
storing at least a portion of said transformed values of selected candidate blocks from a vertical strip;
wherein said selecting a candidate block from the search frame comprises selecting a new vertical strip which allows re-use of said at least a portion of said transformed values of said selected candidate blocks from a prior vertical strip.

17. The method of claim 12, wherein said candidate block comprises a plurality of columns and a plurality of sub-blocks, wherein said performing a frequency domain transform on the selected candidate block from the search frame includes:
performing a frequency domain transform on each of said plurality of columns of said selected candidate block;
wherein said storing at least a portion of said transformed values of the selected candidate block comprises storing transformed values of one or more of said columns;
wherein said selecting a candidate block from the search frame includes selecting a candidate block which re-uses said stored transformed values of said one or more of said columns.

18. The method of claim 17, wherein said search frame comprises a plurality of horizontal bands;
wherein said search frame further comprises a plurality of vertical strips, wherein each of said vertical strips comprises a plurality of columns;
wherein said selecting a candidate block from the search frame comprises:
selecting a vertical strip which re-uses computed columns of a prior selected vertical strip; and
for each vertical strip, selecting a horizontal band in the vertical strip.

19. The method of claim 18, wherein said selecting a horizontal band in the vertical strip comprises:
for each vertical strip, selecting a horizontal band in the vertical strip which re-uses computed portions of a prior horizontal band.

20. An MPEG encoder for performing motion estimation between a target frame and a search frame, wherein the target frame includes a plurality of target blocks, the MPEG encoder comprising:
a DCT transform block for performing a frequency domain transform on the plurality of target blocks in the target frame;
means for selecting a candidate block from the search frame, wherein the DCT block performs a frequency domain transform on the selected candidate block from the search frame;
means for determining one or more target blocks in the target frame in response to the selected candidate block;
means for computing a distance between the transformed values of the selected candidate block and the transformed values of each of said one or more determined target blocks, wherein said computing produces a distance for each of said one or more determined target blocks;
means for determining if said computed distance is a better metric than a currently stored computed distance for each of said one or more determined target blocks;
a memory for storing a location of said selected candidate block for a respective target block if said computed distance for said respective target block is a better metric than the current best computed distance for said respective target block;

wherein said means for selecting a candidate block from the search frame, said DCT block for performing a frequency domain transform on the selected candidate block from the search frame, said means for determining one or more target blocks in the target frame, said means for computing a distance, said means for determining if said computed distance is a better metric, and said memory storing a location of said selected candidate block, operate for a plurality of candidate blocks in said search frame, wherein said MPEG encoder produces motion vectors for a plurality of said target blocks in said target frame.

21. The MPEG encoder of claim 20, wherein said means for determining one or more target blocks in the target frame comprises determining one or more target blocks in the target frame which have a corresponding search window which includes the selected candidate block.

22. The MPEG encoder of claim 20, wherein said means for computing a distance between the transformed values of the selected candidate block and the transformed values of each of said one or more determined target blocks comprises:

a subtracter for subtracting the transformed values of the selected candidate block from the transformed values of each of said one or more determined target blocks, wherein said subtracter produces a matrix for each of said one or more determined target blocks; and means for determining the number of values in said matrices which will be quantized to zero for each of said one or more determined target blocks.

23. The MPEG encoder of claim 20, wherein said means for computing a distance between the transformed values of the selected candidate block and the transformed values of each of said one or more determined target blocks comprises:

a subtracter for subtracting the transformed values of the selected candidate block from the transformed values of each of said one or more determined target blocks, wherein said subtracter produces a matrix for each of said one or more determined target blocks;

a quantizer for quantizing said matrices for each of said one or more determined target blocks;

an encoder for encoding each of said quantized matrices for each of said one or more determined target blocks into a plurality of bits; and means for determining which of said encoded matrices has a least number of bits.

24. The MPEG encoder of claim 20, further comprising:

a memory for storing said computed distance for said respective target block if said computed distance is a better metric than the current best computed distance for said respective target block.

25. The MPEG encoder of claim 20, further comprising:

memory for storing at least a portion of said transformed values of the selected candidate block;

wherein said means for selecting a candidate block from the search frame selects a candidate block which re-uses said at least a portion of said transformed values of a prior selected candidate block.

26. A method for performing motion estimation between a target frame and a search frame, wherein the target frame includes a plurality of target blocks, the method comprising:

selecting a candidate block from the search frame;

determining one or more target blocks in the target frame in response to said selected candidate block;

computing a distance between the values of the selected candidate block and the values of each of said one or more determined target blocks, wherein said computing produces a distance for each of said one or more determined target blocks;

determining if said computed distance is a better metric than a currently stored computed distance for each of said one or more determined target blocks;

storing a location of said selected candidate block for a respective target block if said computed distance for said respective target block is a better metric than the current best computed distance for said respective target block;

wherein said selecting a candidate block from the search frame, determining one or more target blocks in the target frame, computing a distance, determining if said computed distance is a better metric, and storing a location of said selected candidate block, are performed for a plurality of candidate blocks in said search frame, wherein said performing for said plurality of candidate blocks in said search frame produces motion vectors for a plurality of said target blocks in said target frame.

27. The method of claim 26, wherein said determining one or more target blocks in the target frame comprises determining one or more target blocks in the target frame which have a corresponding search window which includes the selected candidate block.

28. The method of claim 26, wherein said selecting a candidate block from the search frame, determining one or more target blocks in the target frame, computing a distance, determining if said computed distance is a better metric, and storing a location of said selected candidate block, are performed for all candidate blocks in said search frame, wherein said performing for all candidate blocks in said search frame produces motion vectors for each of said target blocks in said target frame.

29. The method of claim 26, wherein said target frame and said search frame are comprised in an MPEG stream.

* * * * *